US006411584B2

(12) United States Patent
Davis et al.

(10) Patent No.: US 6,411,584 B2
(45) Date of Patent: *Jun. 25, 2002

(54) CARTRIDGE LOADING APPARATUS AND METHODS OF MANUFACTURING AND OPERATING SAME

(75) Inventors: Marvin B. Davis; Kent T. Murphy, both of Colorado Springs, CO (US)

(73) Assignee: Discovision Associates, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/256,336

(22) Filed: Feb. 19, 1999

Related U.S. Application Data

(62) Division of application No. 08/885,129, filed on Jun. 30, 1997, now Pat. No. 6,009,061, which is a continuation of application No. 08/482,052, filed on Jun. 7, 1995, now abandoned, which is a division of application No. 08/296,794, filed on Aug. 25, 1994, now Pat. No. 5,724,331.

(51) Int. Cl.$^7$ .......................... G11B 17/04; G11B 11/10
(52) U.S. Cl. ...................................... 369/77.2; 369/256
(58) Field of Search ............................... 369/75.1, 75.2, 369/77.1, 77.2, 244, 256; 360/99.02, 99.03, 99.06, 99.07, 105

(56) References Cited

U.S. PATENT DOCUMENTS

| | | | |
|---|---|---|---|
| 4,252,327 A | 2/1981 | Elliott et al. | 369/213 |
| 4,274,119 A | 6/1981 | Hayward et al. | 360/99.02 |
| 4,340,955 A | 7/1982 | Elliott | 369/213 |
| 5,195,079 A | 3/1993 | Inoue et al. | 369/77.2 |
| 5,202,861 A | 4/1993 | Yoshida | 369/13 |

(List continued on next page.)

FOREIGN PATENT DOCUMENTS

| | | |
|---|---|---|
| DE | 3930953 | 3/1990 |
| EP | 216442 | 4/1987 |
| EP | 439286 | 7/1991 |
| EP | 482585 | 4/1992 |

(List continued on next page.)

*Primary Examiner*—William Klimowicz
(74) *Attorney, Agent, or Firm*—Keiji Masaki; Steve A. Wong; Caroline T. Do

(57) ABSTRACT

A cartridge unloading apparatus for a disk drive having a cartridge loading end, a remote end, and a base plate. The apparatus is employed for tiltably unloading the disk from a spindle magnet with a peeling action. The apparatus includes first and second sliders positioned relative the ends of the disk drive. The sliders each have only one S-shaped slot formed therein. Each slider has a slot to receive one of the two lifting pins provided on a cartridge receiver. The movement of the sliders drives the lifting pins along the slots, thereby raising or lowering the cartridge receiver depending upon the direction of rotation of the tiller. The sliding motion of the lifting pins engaged in the S-shaped slots thus unloads a disk from or, alternatively, loads the disk onto the drive spindle. As the lifting pins travel along their respective slots, the lifting and lowering of the disk is accomplished in such a manner that the disk hub is peeled from the spindle magnet rather than being lifted vertically off the spindle. This reduces the peak force required to break the magnetic clamp force between the spindle magnet and the disk hub. The apparatus may include a bias coil assembly rotatably mounted on an arm so that the bias coil assembly may be loaded into or extracted from the disk cartridge and placed out of the travel path of the disk cartridge. Methods for manufacturing and operating the apparatus in conjunction with a disk drive are also provided.

21 Claims, 17 Drawing Sheets

U.S. PATENT DOCUMENTS

| | | | |
|---|---|---|---|
| 5,224,079 A | 6/1993 | Inoue | 369/77.2 |
| 5,297,117 A | 3/1994 | Uzuki et al. | 369/75.2 |
| 5,309,421 A | 5/1994 | Fujisawa | 369/77.1 |
| 5,500,838 A | 3/1996 | Matsumoto et al. | 369/13 |
| 5,684,776 A | 11/1997 | Davis et al. | 369/77.2 |
| 5,703,857 A | 12/1997 | Davis et al. | 369/77.2 |
| 5,724,331 A | 3/1998 | Davis et al. | 369/77.2 |
| 4,367,545 A | 1/1983 | Elliott | 369/213 |
| 4,419,703 A | 12/1983 | Gruczelak et al. | 360/99.06 |
| 4,467,467 A | 8/1984 | Wilkinson et al. | 369/111 |
| 4,488,279 A | 12/1984 | Wilkinson et al. | 369/54 |
| 4,545,045 A | 10/1985 | Baer et al. | 369/77.2 |
| 4,603,363 A | 7/1986 | Rickert et al. | 360/86 |
| 4,677,607 A | 6/1987 | Ejiri | 369/77.1 |
| 4,718,050 A | 1/1988 | Kurz et al. | 369/44.13 |
| 4,718,051 A | 1/1988 | Ohshima et al. | 369/44.29 |
| 4,718,052 A | 1/1988 | Kondo et al. | 369/44.12 |
| 4,718,053 A | 1/1988 | Sato et al. | 369/44.23 |
| 4,718,054 A | 1/1988 | Schell et al. | 369/54 |
| 4,719,610 A | 1/1988 | Bates et al. | 369/32 |
| 4,719,611 A | 1/1988 | Miura et al. | 369/47 |
| 4,719,612 A | 1/1988 | Kenjyo | 369/54 |
| 4,719,613 A | 1/1988 | Hirose et al. | 369/109 |
| 4,719,614 A | 1/1988 | Leterme et al. | 369/110 |
| 4,719,615 A | 1/1988 | Feyrer et al. | 369/284 |
| 4,720,824 A | 1/1988 | Hayashi | 369/44.12 |
| 4,720,825 A | 1/1988 | Kokado | 369/46 |
| 4,720,826 A | 1/1988 | Sugiyama et al. | 369/283 |
| 4,722,077 A | 1/1988 | Jachmann et al. | 369/25 |
| 4,722,078 A | 1/1988 | Nakanishi et al. | 369/39 |
| 4,722,079 A | 1/1988 | Matsumoto | 369/44.32 |
| 4,722,080 A | 1/1988 | Dieckmann | 369/254 |
| 4,723,234 A | 2/1988 | Katsuyama et al. | 369/58 |
| 4,726,009 A | 2/1988 | Issac | 369/292 |
| 4,730,292 A | 3/1988 | Hasegawa et al. | 369/39 |
| 4,730,296 A | 3/1988 | Urata et al. | 369/75.2 |
| 4,731,775 A | 3/1988 | Katsuyama et al. | 369/77.2 |
| 4,731,776 A | 3/1988 | Ishii et al. | 369/77.2 |
| 4,733,387 A | 3/1988 | Yoshimura | 369/77.1 |
| 4,736,356 A | 4/1988 | Konshak | 369/77.2 |
| 4,737,947 A | 4/1988 | Osato et al. | 369/13 |
| 4,740,937 A | 4/1988 | Watanabe | 369/13 |
| 4,744,072 A | 5/1988 | Tamaki et al. | 369/75.2 |
| 4,750,065 A | 6/1988 | Masaki et al. | 360/99.02 |
| 4,759,008 A | 7/1988 | Hirano et al. | 369/75.2 |
| 4,764,917 A | 8/1988 | Sugihara et al. | 369/77.1 |
| 4,773,056 A | 9/1988 | Ito | 369/75.2 |
| 4,773,058 A | 9/1988 | Petruchik et al. | 369/77.2 |
| 4,777,631 A | 10/1988 | Kamoshita et al. | 369/77.2 |
| 4,791,511 A | 12/1988 | Davis | 369/77.2 |
| 4,866,693 A | 9/1989 | Odawara et al. | 369/75.2 |
| 4,896,312 A | 1/1990 | Odawara et al. | 369/77.2 |
| 4,899,238 A | 2/1990 | Inoue et al. | 360/99.06 |
| 5,060,207 A | 10/1991 | Kaneda et al. | 369/13 |
| 5,123,004 A | 6/1992 | Arai | 369/77.2 |
| 5,126,899 A | 6/1992 | Kanazawa | 360/99.07 |

FOREIGN PATENT DOCUMENTS

| | | | |
|---|---|---|---|
| EP | 521217 | 1/1993 | |
| EP | 594118 | 4/1994 | |
| EP | 606911 | 7/1994 | |
| EP | 609024 | 8/1994 | |
| JP | 62256285 | 11/1987 | 360/133 |
| JP | 6381648 | 4/1988 | |
| JP | 5101507 | 4/1993 | |

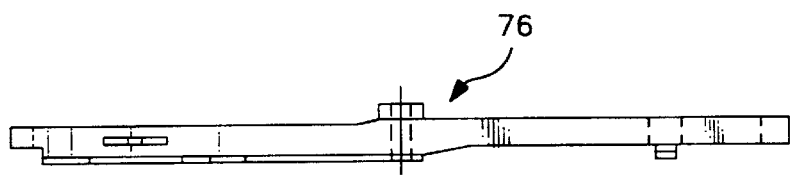
FIG. 5A
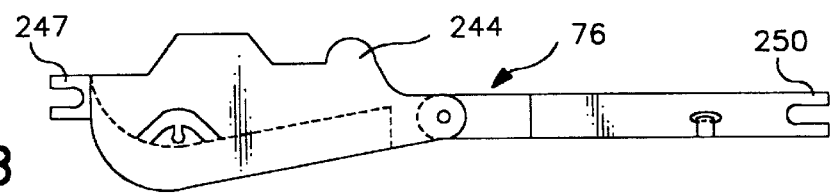
FIG. 5B
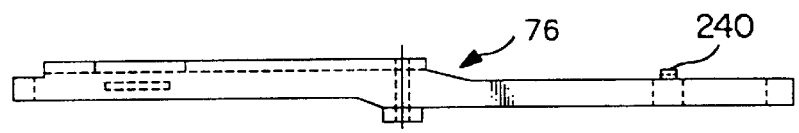
FIG. 5C
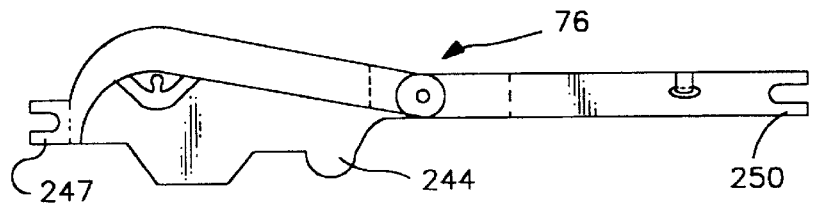
FIG. 5D
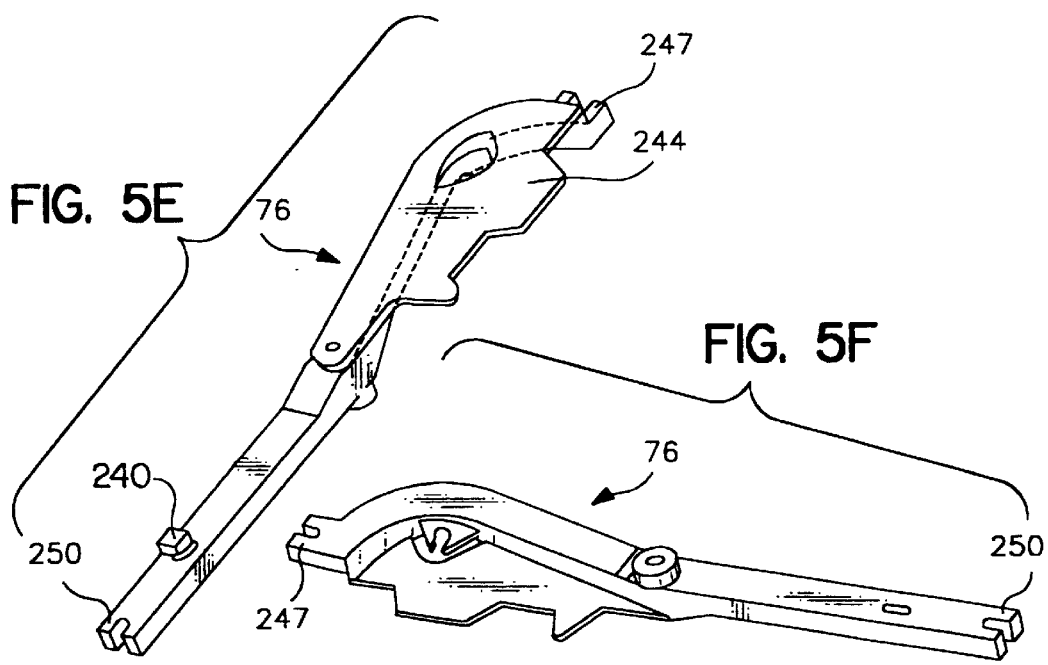
FIG. 5E
FIG. 5F

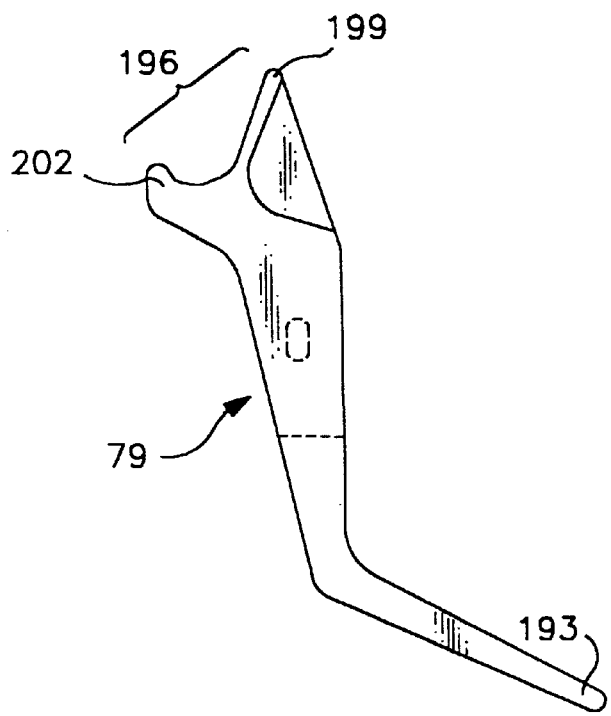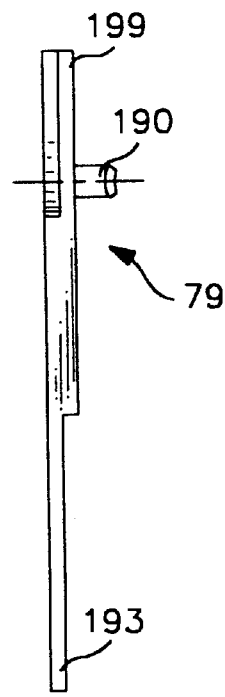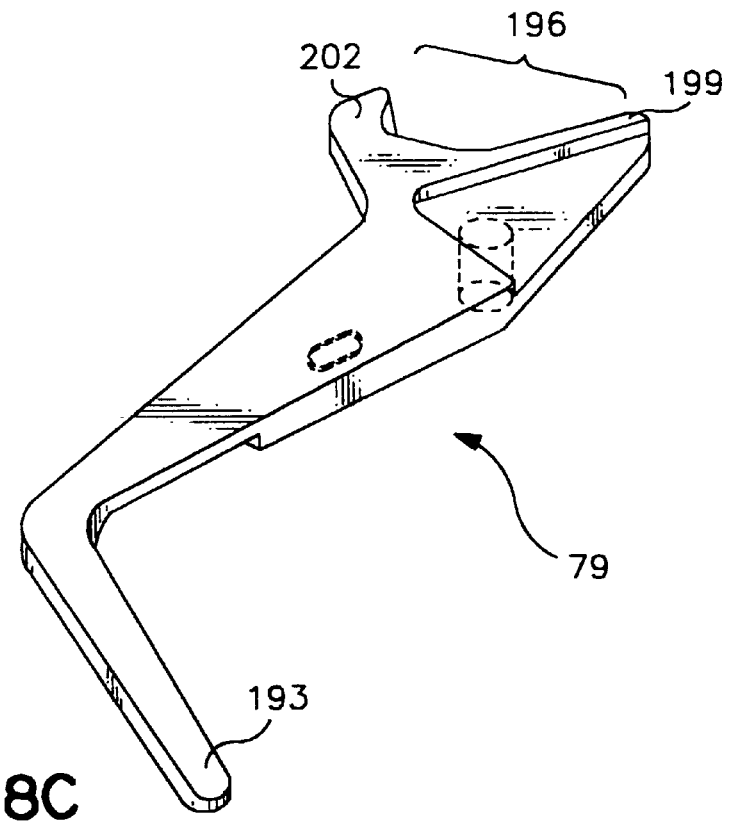
FIG. 8A
FIG. 8B
FIG. 8C

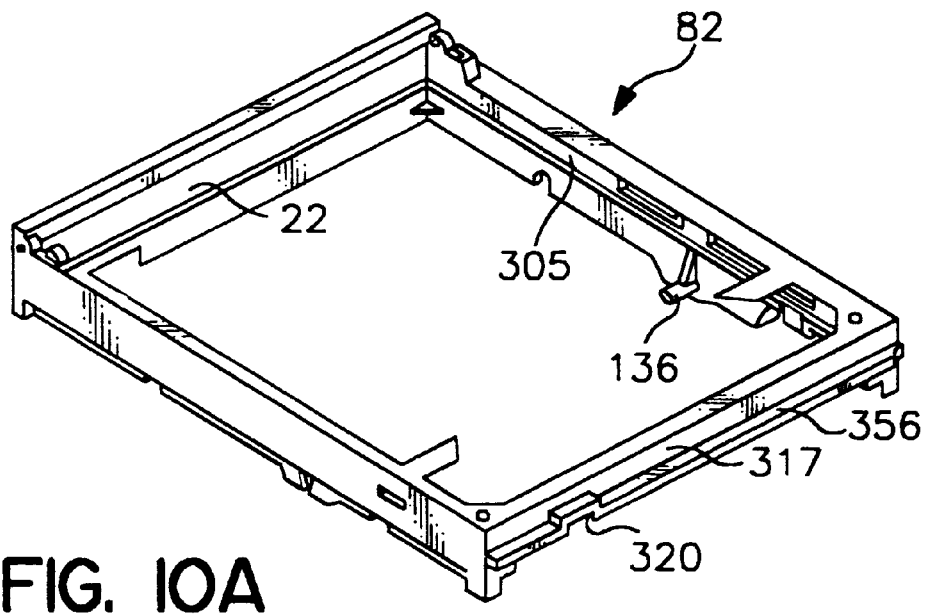
FIG. IOA
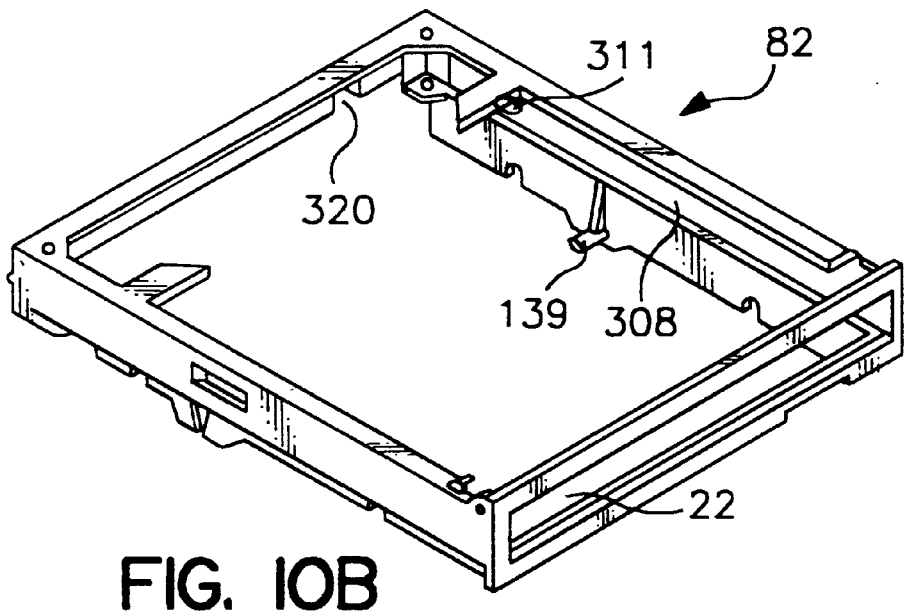
FIG. IOB

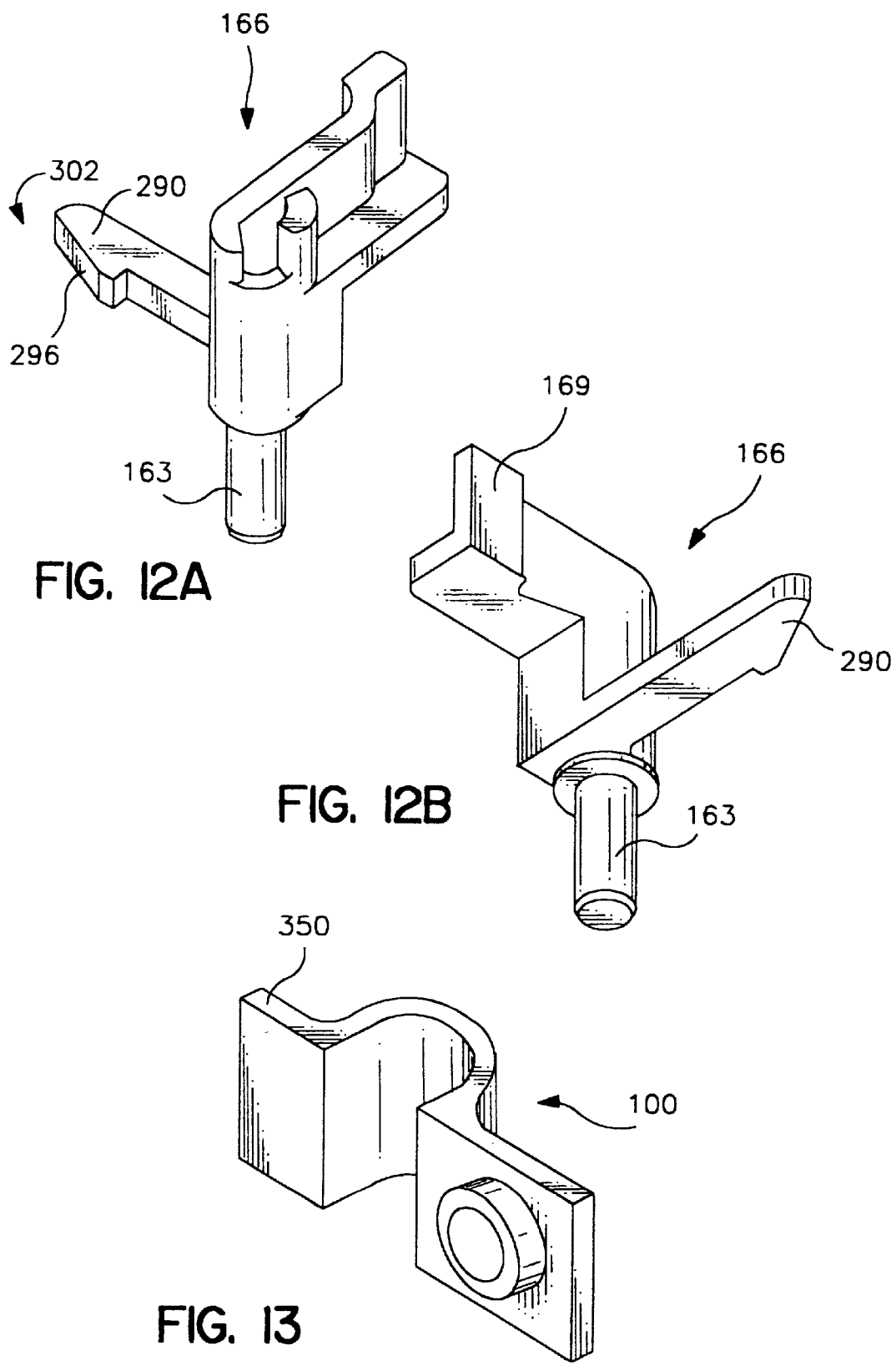

CARTRIDGE LOADING APPARATUS AND METHODS OF MANUFACTURING AND OPERATING SAME

CROSS-REFERENCE TO RELATED APPLICATIONS

This application is a divisional of U.S. patent application Ser. No. 08/885,129, filed Jun. 30, 1997, now U.S. Pat. No. 6,009,061 which is a continuation of U.S. patent application Ser. No. 08/482,052, filed Jun. 7, 1995, now abandoned, which is a divisional of U.S. patent application Ser. No. 08/296,794, filed Aug. 25, 1994, now U.S. Pat. No. 5,724,331.

BACKGROUND OF THE INVENTION

1. Field of the Invention

This invention relates in general to data storage systems of the type that include a housing having an opening for receipt of a removable disk cartridge in which an information recording medium is mounted for protection. More particularly, but without restriction to the particular embodiments hereinafter described in accordance with the best mode of practice, this invention relates to a cartridge loading apparatus for respectively loading and unloading a removable disk cartridge on and off a magnetically clamped spindle interface for rotation relative to read-write head while in a loaded position.

2. Discussion of the Related Art

The demand for mass data storage continues to increase with expanding use of data processing systems and personal computers. Optical data storage systems are becoming an increasingly popular means for meeting this expanding demand. These optical data systems provide large volumes of relatively low-cost storage that may be quickly accessed.

In optical disk systems, coded video signals, audio signals, or other information signals are recorded on a disk in the form of information tracks on one or both planar surfaces of the disk. At the heart of an optical storage system is at least one laser or other light source. In a first operating mode, the laser generates a high-intensity laser beam that is focused on a small spot on an information track of a rotating storage disk. This high-intensity laser beam raises the temperature of the recording surface of the material above its Curie Point—the point at which the material loses its magnetization and accepts the magnetization of the magnetic field in which the disk is placed. Thus, by controlling or biasing this surrounding magnetic field, and allowing the disk to cool below its Curie Point in a controlled magnetic environment, information may be recorded on the disk in the form of "pits" or "marks" on the recording medium.

Subsequently, when the operator desires to reproduce or read the previously recorded information, the laser enters a second operating mode. In this mode, the laser generates a low-intensity laser beam that is again focused on the tracks of the rotating disk. This lower intensity laser beam does not heat the disk above its Curie Point. The laser beam is, however, reflected from the disk surface in a manner indicative of the previously recorded information due to the presence of the previously formed pits or marks, and the previously recorded information may thereby be reproduced. Since the laser may be tightly focused, an information processing system of this type has advantages of high recording density and accurate reproduction of the recorded information.

The components of a typical optical system include a housing with an insertion port through which the user inserts the recording media into the drive. This housing accommodates, among other items, the mechanical and electrical subsystems for loading, reading from, writing to, and unloading an optical disk. The operation of these mechanical and electrical subsystems is typically within the exclusive control of the data processing system to which the drive is connected.

Within the housing of a conventional system that uses disk cartridges, a turntable for rotating a disk thereon is typically mounted on the system baseplate. The turntable may include a spindle having a magnet upon which a disk hub is mounted for use. The magnet attracts the disk hub, thereby holding the disk in a desired position for rotation.

In optical disk systems, as discussed above, it is necessary to magnetically bias the disk during a writing operation by applying a desired magnetic field to at least the portion of the disk being heated by the laser during the writing (recording or erasing) operation. Thus, it is necessary to mount a magnetic field biasing device where it may be conveniently placed in close proximity to the disk surface when the disk is held in position by the magnet associated with the spindle.

A variety of media or disk types is used in optical data storage systems for storing digital information. For example, standard optical disk systems may use 5¼ inch disks, and these optical disks may or may not be mounted in a protective case or cartridge. If the optical disk is not fixedly mounted in a protective cartridge, an operator manually removes the disk from the protective case. The operator would then manually load the disk onto a loading mechanism, using care to prevent damage to the recording surface.

Alternatively, for purposes of convenience and protection, a disk may be mounted within an enclosure or a cartridge that is itself inserted into the insertion port of the drive and is then conveyed to a predetermined position. These disk cartridges are well known in the computer arts. The disk cartridge includes a cartridge housing containing a disk upon which data may be recorded.

To protect the disk when the cartridge is external from the drive, the disk cartridge typically includes at least one door or shutter that is normally closed. The cartridge shutter may have one or more locking tabs associated with it. The corresponding disk drive includes a mechanism for opening the door or shutter on the cartridge as the cartridge is pushed into the system. Such a mechanism may include a door link that makes contact with a locking tab, thereby unlocking the shutter. As the cartridge is inserted further into the drive, the shutter is opened to partially expose the information recording medium contained therein. This permits a disk hub to be loaded onto a spindle of a motor or other drive mechanism, and permits entry of a read-write head and a bias magnetic into the protective cartridge. The disk, when rotated by the drive mechanism, permits the read-write head to access all portions of the disk media.

To conserve space in optical storage systems, it is desirable to minimize the size required by the apparatus that loads a disk onto and unloads the disk from a spindle. Conventional loading and unloading devices vary depending upon the type of disk being used. A conventional disk loading and unloading system that uses disk cartridges is typically capable of automatically transporting a disk cartridge from a receiving port onto the spindle. When the disk is no longer required, a conventional disk loading and unloading system automatically unloads the disk from the spindle. A loading device for performing this loading and unloading of the disk is generally constructed so that during disk loading (i.e., when the disk is moved from an ejected position into the player and onto the spindle), the disk is moved horizontally, parallel to the baseplate and turntable, towards the turntable. When the disk has been positioned above the turntable, the disk is lowered vertically, perpendicular to the face of the turntable, onto the spindle. Once on the turntable, a spindle magnet attracts the disk hub fixed to the center of the media, thereby clamping the disk in a rotatable condition for read-write operations.

When an operator is finished using the disk, the operator initiates an eject operation. The most common solution for ejecting a cartridge and disk from a spindle is the technique used in most Japanese drives. In this type of disk unloading apparatus, a cartridge "box" has four pins at its sides, and the pins ride in tracks in an adjacent sheet metal guide. During disk ejection, the cartridge box lifts the disk straight up and off the spindle. The apparatus then moves the disk horizontally, parallel to the baseplate and turntable, towards the disk receiving port in the front of the player. When the disk is thus lifted from the spindle during the unloading operation, it is necessary to generate sufficient upward force on the cartridge to overcome the magnetic clamping force holding the disk hub on the spindle magnet. The peak upward force required to overcome the magnetic clamping force may be produced by the manual operation of an ejection lever or by the activation of an electric ejection system.

In conventional electric ejection systems, wherein the disk cartridge unloading apparatus vertically lifts the disk cartridge to break the magnetic force between the spindle magnet and the disk hub, the electric ejection motor must generate a large load to effect removal of the disk cartridge. Consequently, when an operator opts to use the electric ejection system, a large motor having a large torque is required to generate sufficient vertical lifting force. Space must be reserved in the system housing to accommodate this large motor, thereby increasing the overall size of the housing for the cartridge-loading apparatus. In addition, the large motor consumes a considerable amount of power.

It is thus desirable to reduce the complexity of the disk player, while reducing the overall size of the player to facilitate the drive's convenient use in computer applications. In order to be able to receive a 5¼ inch disk cartridge and yet be small enough to be conveniently used in conjunction with a personal computer, optical disk drives must use compact and carefully located mechanical and electrical subsystems.

With this in mind, it is desirable to reduce the size of the required ejection motor. One way to effect this result is to reduce the amount of force required to break the magnetic clamping force holding the disk hub on the spindle magnet. By reducing this required force, it is possible to use a smaller ejection motor in the player. Hence, a disk loading apparatus design wherein the disk is not vertically lifted off of the spindle magnet, but is, rather, "peeled" from the magnet would be advantageous.

A conventional method that attempts to achieve this peeling action has the turntable and spindle swing down away from the disk. This method is discussed in U.S. Pat. No. 4,791,511 granted to Marvin Davis. It would nevertheless be of benefit to design a drive wherein the disk is peeled from the spindle magnet.

OBJECTS AND SUMMARY OF THE INVENTION

It is, therefore, an object of the present invention to improve disk drives.

Another object of this invention is to mitigate the above-described problems and disadvantages by optimizing mechanical interaction of the component elements of an optical recording medium mounting apparatus.

Still another object of the present invention is to reduce the load required from a disk ejection mechanism during disk loading and unloading.

It is a further object of the present invention to utilize a minimum force for loading a data storage disk onto a drive spindle and for unloading a data storage disk from a drive spindle.

Yet another object of the present invention is to load and unload a disk cartridge in a disk drive while minimizing displacement between an upper position and a loaded position.

And still another object of this invention is to improve methods for operating a cartridge loading apparatus utilized in conjunction with a disk drive system.

Still yet a further object of this invention is to reduce the friction between moving component parts of a cartridge loading and unloading assembly and apparatus as utilized in a disk drive.

An additional object of the present invention is to employ a direct gear train for transmitting force among the component elements of a cartridge loading apparatus to thereby more effectively transfer and reduce the force needed to activate the moving component elements.

Yet a further object of the present invention is to improve the cartridge receiver of a cartridge loading apparatus as employed in a disk drive.

It is yet another object of the present invention to improve the baseplate and cartridge receiver latch of a cartridge loading apparatus as implemented in a disk drive.

Yet still a further object of this invention to optimize the mechanical interaction among the tiller, cam, ejection motor, cartridge receiver, baseplate, sliders, cartridge receiver latch, parking arm, and gear train in the cartridge loading apparatus of a disk drive so that frictional resistance is reduced and movement minimized.

And yet another object of the present invention is to improve methods of manufacturing a cartridge loading apparatus employed in conjunction with a disk drive system.

Still a further object of the present invention is to improve a cartridge loading apparatus with a tilting bias coil assembly for use in a disk drive.

Yet still another object of this invention is to improve the parking arm of a cartridge loading apparatus as employed in a disk drive.

It is still yet a further object of the present invention to optimize the mechanical interaction among the tiller, cam, ejection motor, cartridge receiver, baseplate, sliders, cartridge receiver latch, bias coil assembly, parking arm, and gear train in the cartridge loading apparatus of a disk drive so that frictional resistance is reduced and movement minimized.

Still another object of this invention is to improve the sliders of a cartridge loading apparatus as utilized in a disk drive.

Yet a further object of the present invention is to improve the tiller of a cartridge loading apparatus as employed in a disk drive.

And still yet another object of this invention is to improve methods for assembling the elements of a cartridge loading apparatus for use in a disk drive system.

These and other objects are attained in accordance with the present invention wherein there is provided a cartridge unloading apparatus for a disk drive having a cartridge loading end, a remote end, and a base plate. The apparatus is employed for tiltably unloading the disk from a spindle magnet with a peeling action. The apparatus includes a first slider having a forward end adjacent the cartridge loading end of the disk drive and a remote end adjacent the remote end of the disk drive. The first slider has only one S-shaped slot formed therein. A second slider having a forward end adjacent the cartridge loading end of the disk drive and a remote end adjacent the remote end of the disk drive is also provided. The second slider similarly has only one S-shaped slot formed therein.

According to one aspect of this invention, there is further provided a tiller having a first end and a second end. The first end of the tiller is swingably linked with the forward end of the first slider, and the second end of the tiller is swingably linked with the forward end of the second slider. In this manner, a first rotation of the tiller in a first direction about a tiller axis drives the first slider toward the cartridge loading end of the disk drive while driving the second slider toward the remote end of the disk drive, and a second rotation of the tiller in a second direction about the tiller axis drives the first slider toward the remote end of the disk drive while driving the second slider toward the cartridge loading end of the disk drive.

There is also provided a cartridge receiver for receiving a respective cartridge containing a disk with a central hub. The cartridge receiver is moveable between an upper position and a lower position when the sliders are driven by the tiller.

According to another aspect of this invention, there is further provided a first lifting pin and a second lifting pin associated with the cartridge receiver. The first lifting pin slidably fits into one of the S-shaped slots, and the second lifting pin slidably fits into the other S-shaped slot. The lifting pins are non-coplanar with a plane that is parallel to the ends of the disk drive and perpendicular to a base plate, and that passes through substantially the center of the spindle magnet.

In one embodiment of the present invention, the cartridge loading apparatus includes a stop cooperatively interacting with the sliders to prevent the sliders from further movement when the disk is fully loaded.

In accordance with a preferred embodiment of this invention, the cartridge loading apparatus of either of the above embodiments further includes a first slider channel in which the first slider is slidably mounted and a second slider channel in which the second slider is slidably mounted. In this embodiment, the base plate includes one pair of substantially vertical slots in which the lifting pins are accommodated in a raising and lowering motion of the receiver.

According to another preferred aspect of this invention, a label end of the cartridge remains visible when the cartridge is loaded in the drive while contained and protected within the cartridge loading end of the disk drive for reading and/or writing. In this manner, an operator may write on the label, or attach other printed labels, to indicate what information is being stored thereon while the disk drive is operating.

In accordance with yet another aspect of this invention, there is also provided a disk drive system having a spindle magnet, and a spindle motor adapted to operate in conjunction with any of the above embodiments of the cartridge loading apparatus according to this invention. In this system, rotation of the tiller in the first direction tiltably unloads the disk from the spindle magnet, and rotation of the tiller in the second direction tiltably loads the disk onto the spindle magnet with a raising and lowering motion.

According to still yet another aspect of this invention, there is provided a method of loading a disk onto and, alternatively, unloading a disk from a magnetically clamped spindle interface of a disk drive system having a front side and a rear side. This method includes steps of providing a cartridge receiver having a first lifting pin and a second lifting pin each respectively mounted on first and second sides of the cartridge receiver, and positioning a first slider and a second slider relative to the cartridge receiver, The first slider is slidably mounted in a first slider channel and the second slider is slidably mounted in a second slider channel. The method continues with the steps of providing one S-shaped slot in the first slider, providing one S-shaped slot in the second slider, and swingably attaching a tiller to the sliders so that the sliders move in opposite directions from each other and within their respective slider channels under the influence of the tiller. By rotatably attaching the tiller to the disk drive system at a tiller axis, the tiller axis is fixed relative to the disk drive system. The method then concludes with the steps of linking a cartridge receiver to the first slider and to the second slider by their respective S-shaped slots and permitting the sliders to move relative to each other and relative to the cartridge receiver, thereby causing the lifting pins to follow the slots in the sliders to alternatively raise and lower the cartridge receiver.

In one preferred embodiment of the method according to this invention, there is provided the further steps of minimizing the movement of the cartridge receiver along a first direction from the front side to the rear side of the disk drive system and, while performing the minimizing step, permitting the cartridge receiver to move substantially perpendicular to the first direction and to pitch about the lifting pins so that the cartridge receiver is tiltably raised and lowered when the movement of the sliders causes the lifting pins to follow the slots in the sliders to alternatively raise and lower the cartridge receiver.

In another preferred embodiment of this method, the permitting step includes inserting a disk cartridge into the cartridge receiver until a remote end of the disk cartridge releases a receiver latch thereby preventing the sliders from moving. The unloading of the disk from the magnetically clamped spindle interface of the disk drive system may advantageously include causing the tiller to rotate to activate the sliders to drive the lifting pins along the slots to thereby tiltably raise the cartridge receiver. In another embodiment of the present method, the tiller is manually activated to rotate thereby tiltably raising the cartridge receiver and unloading the disk. Alternatively, the tiller is caused to rotate by an electric motor to thereby tiltably raise the cartridge receiver and unload the disk.

According to yet still another aspect of this invention, there is provided an optical disc system adapted to be operated according to any of the above methods.

There is also provided a method of manufacturing a cartridge loading and unloading mechanism operatively associated with a disc drive having a housing with a cartridge loading end and a remote end. This manufacturing method includes the steps of placing in the housing a first slider having one first S-shaped slot formed therein so that a forward end of the first slider is adjacent the cartridge loading end of the housing and a remote end of the first slider is adjacent the remote end of the housing, placing in the housing a second slider having one second S-shaped slot formed therein so that a forward end of the second slider is adjacent the cartridge loading end of the housing and a remote end of the second slider is adjacent the remote end of the housing, and swingably connecting a first end of a tiller to the first slider and swingably connecting a second end of the tiller to the second slider so that rotation of the tiller in a first direction about a tiller axis drives the first slider toward the cartridge loading end of the housing while driving the second slider toward the remote end of the housing, and rotation of the tiller in a second direction about the tiller axis drives the first slider toward the remote end of the housing while driving the second slider toward the cartridge loading end of the housing. This manufacturing method further includes slidably connecting to the sliders a cartridge receiver having a first lifting pin and a second lifting pin associated therewith so that the first lifting pin fits slidably into the first S-shaped slot, and the second lifting pin fits slidably into the second S-shaped slot.

In order to achieve other objects of the present invention, there is alternatively provided a cartridge loading and unloading apparatus for removable disk cartridges, including a pair of sliders and a tiller. The tiller has two ends, one of which is swingably connected to the forward end of the first slider, and the other of which is swingably connected to the forward end of the second slider. Rotation of the tiller in a first direction about a tiller axis drives the first slider toward the cartridge loading end of the drive unit while driving the second slider toward the remote end of the drive unit, and rotation of the tiller in a second direction about the tiller axis drives the first slider toward the remote end of the drive unit while driving the second slider toward the cartridge loading end of the drive unit. As the first and second sliders move in opposite directions under the influence of the tiller, S-shaped slots in the sliders act on lift pins associated with the cartridge receiver to raise or lower the cartridge receiver.

To achieve still additional objects of the present invention, there is further provided in the alternative an apparatus for unloading a disk cartridge from a magnetic hub. In this embodiment, the apparatus includes a cartridge receiver having first and second lifting points which are located on opposite sides of the cartridge receiver and positioned to cause the cartridge receiver to tilt about a first axis when a force is applied to the lifting points to thereby move a first end of said cartridge receiver from a first position to a second position. This embodiment further includes a stop for impeding movement of the first end of the cartridge receiver when it has moved to the second position. The stop also provides a pivot point for movement of a second end of the cartridge receiver from a first position to a second position. The first and second lifting points in this embodiment may be provided by a first and second lifting pin on said cartridge receiver.

According to one aspect of this embodiment, there may be further provided a first slider having only one S-shaped slot formed therein, and a second slider having only one S-shaped formed therein. In this configuration, the first lifting pin is slidably contained within the S-shaped slot of the first slider and the second lifting pin is slidably contained within the S-shaped slot of the second slider. This embodiment may also further include a tiller arm having a first end connected to a first end of the first slider and a second end connected to a first end of the second slider.

BRIEF DESCRIPTION OF THE DRAWING

Further objects of the present invention together with additional features contributing thereto and advantages accruing therefrom will be apparent from the following description of the preferred embodiments of the invention which are shown in the accompanying drawing with like reference numerals indicating like components throughout, wherein:

FIGS. 5A–5F are elevational and isometric views of a tiller according to the present invention;

FIGS. 8A–8C present elevational and isometric views of a parking arm according to the present invention;

FIGS. 10A–10B are isometric views of a cartridge receiver according to the present invention;

FIGS. 12A–12B are isometric views of a latch that holds the cartridge receiver in the up position in accordance with the teachings of this invention;

FIG. 13 is an isometric view of a bias coil assembly clamp according to the present invention;

DETAILED DESCRIPTION OF THE PREFERRED EMBODIMENTS

Figure 1:
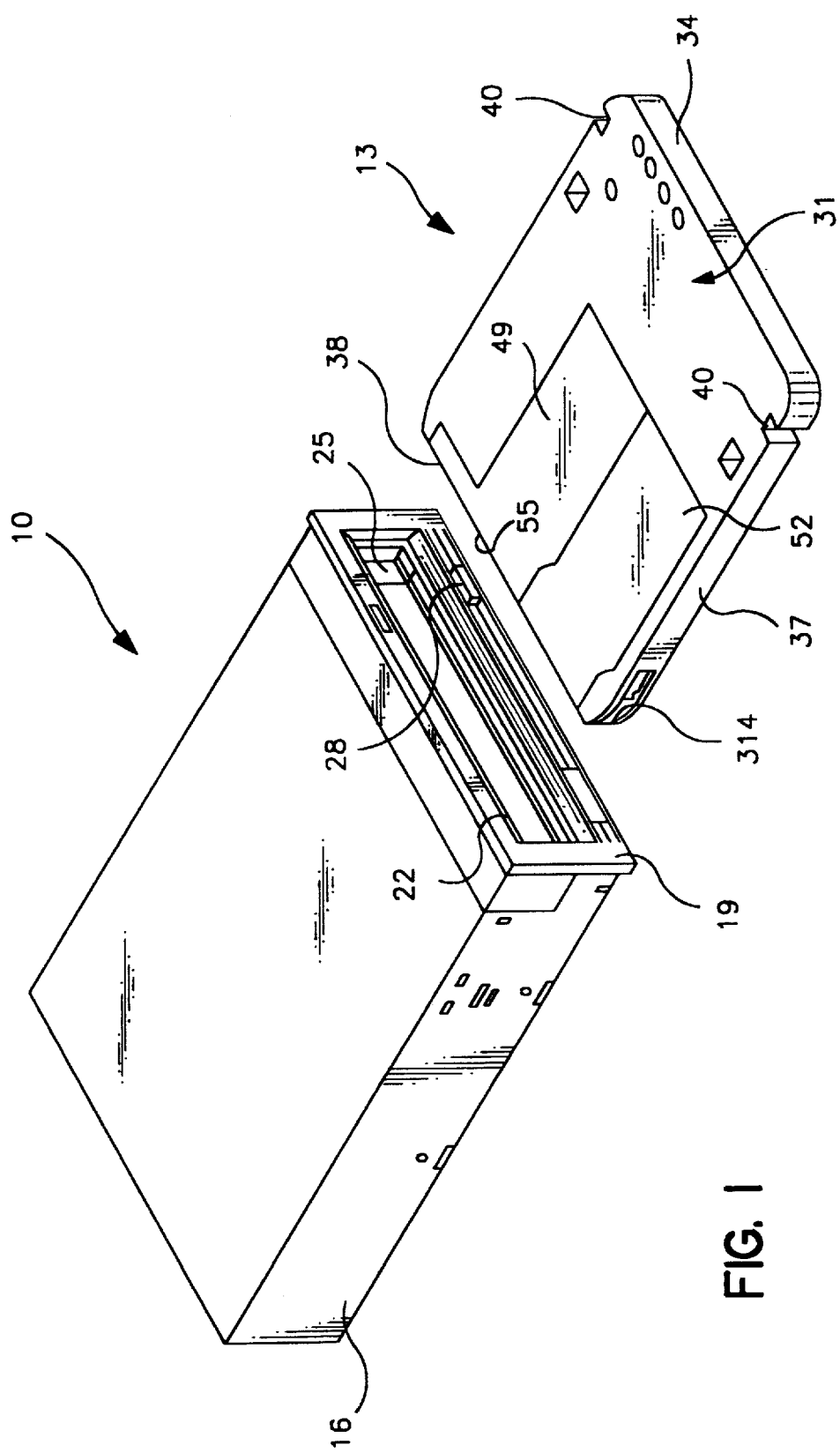
FIG. 1 is an isometric view of a disk drive according to the present invention with a disk cartridge about to be inserted therein.

A further understanding of the present invention may be had by reference to the following description taken in conjunction with the accompanying drawings. Referring first to FIG. 1, there is shown a magnetic disk storage system, generally designated 10. FIG. 1 depicts a replaceable disk cartridge 13 positioned for insertion into the disk drive 10 incorporating the cartridge loading and unloading apparatus of the present invention. The disk drive 10 includes a bottom housing 16 and a face plate 19. The face plate 19 includes a disk receiving port 22, a drive activity indicator light 25, and an ejection button 28.

Continuing to refer to FIG. 1, the disk cartridge 13, which is of a conventional type, includes the following primary components. Its outer housing includes an upper planar surface 31 and a lower planar surface 32 (shown in, for example, FIG. 20). The disk cartridge also has a forward-facing label end 34. In the preferred embodiment, the forward-facing label end 34 of the disk cartridge 13 remains visible to a user while the disk cartridge 13 is inserted in the disk drive 10. Side walls, for example side wall 37, extend between the upper planar surface 31 and the lower planar surface 32, and the cartridge further includes a rear wall 38 (shown in, for example, FIG. 19) extending between the upper planar surface 31 and the lower planar surface 32 parallel to the forward-facing label end 34. Near the label end 34 of the side walls 37 are channels 40 to accommodate cartridge locating pins 43 (FIGS. 3A–3B) located on the base plate 46.

Figure 2:
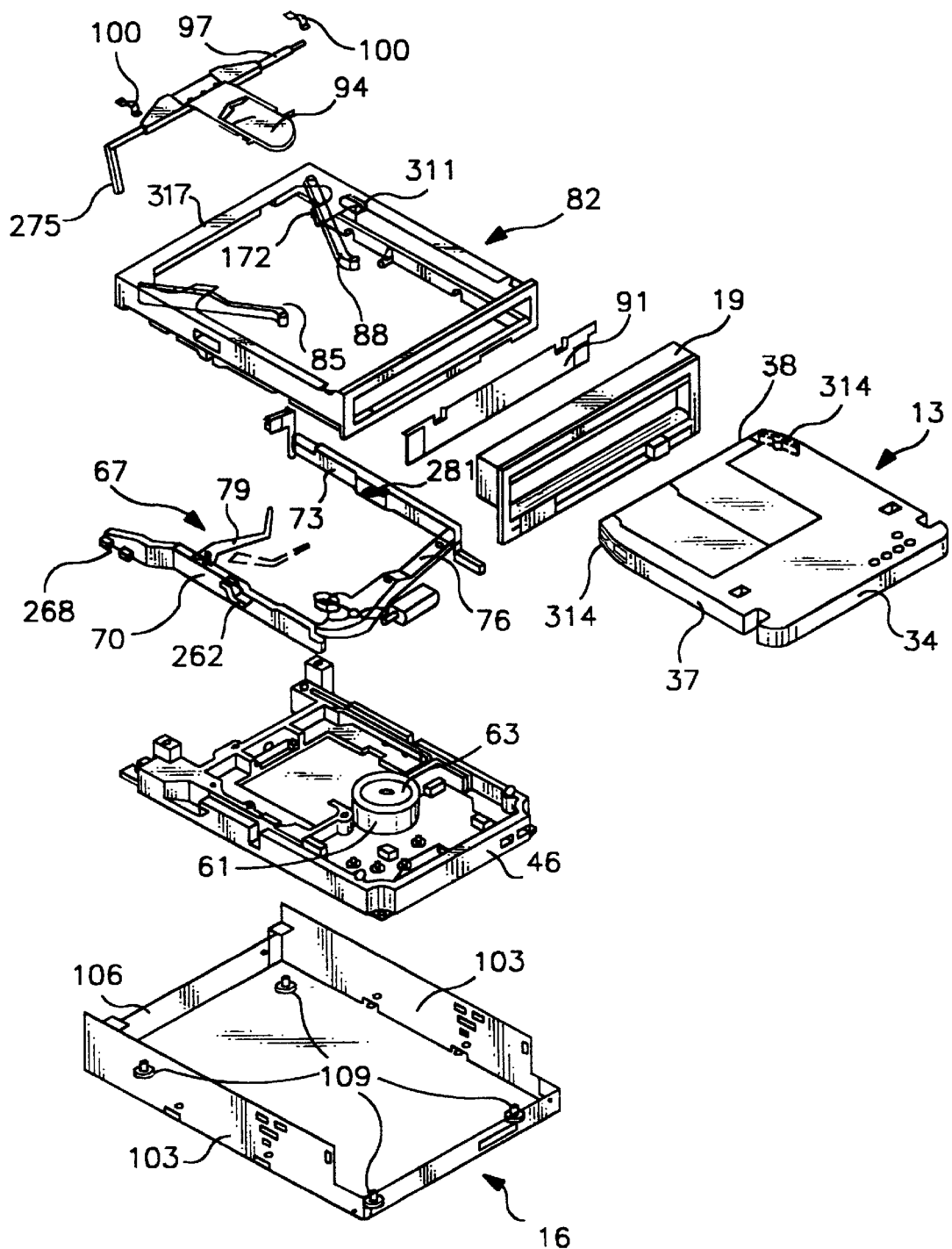
FIG. 2 is an exploded isometric view of the disk drive of FIG. 1, showing the major subassemblies of the disk drive as operated and assembled according to the present invention.
Figure 11A:
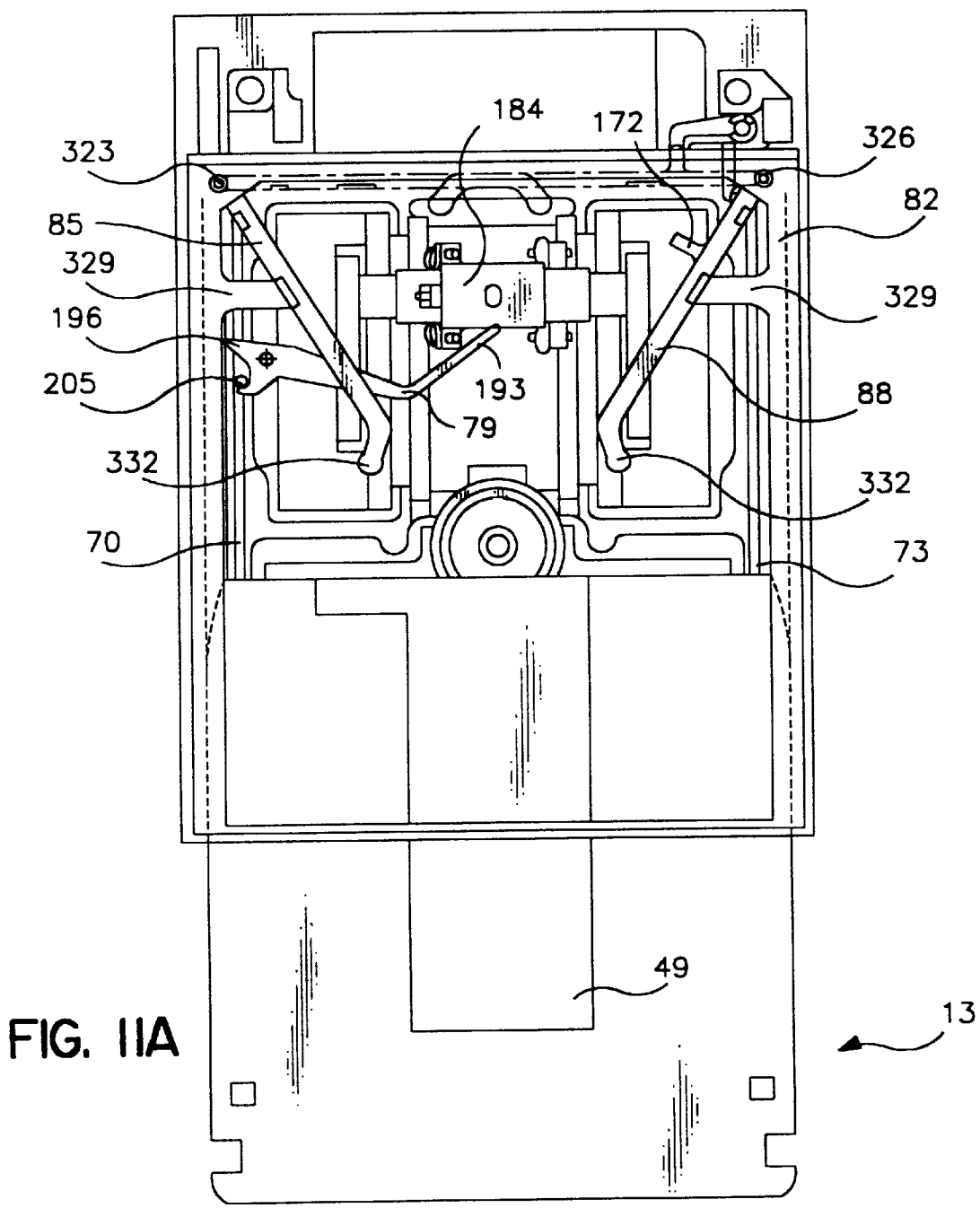
FIG. 11A is an elevational view of the disk drive of FIG. 1, seen during insertion of a disk cartridge, with some features removed to better show the trip lug on the right door link, the latch, and the operative relationship between these features according to the present invention.

The disk cartridge 13 also includes a cartridge door or shutter 49. The shutter 49 is spring-loaded in a closed position (FIGS. 1, 2, and 11A). When the shutter 49 is open, it rests in a recessed portion 52 of the upper planar surface 31. Since the disk drive 10 of the preferred embodiment reads two-sided disk cartridges 13, a similar shutter and recessed portion exists on the lower planar surface 32, but these features are not shown in the figures. The shutter typically has a shutter latch 55 (not shown) on the rear wall 38 of the disk cartridge 13.

Protected within the disk cartridge 13 is a disk 14 (FIGS. 18–20) having a metallic disk hub 15. As is known in the relevant arts, the disk 14 may be formed as a rigid substrate having a magnetic material coating thereon. Embedded in the magnetic material coating are tracks in the form of concentric or spiraling rings. The magnetic coating may be on either one or both surfaces of the rigid substrate, and the coating enables data to be magnetically recorded on the disk 14 by magnetic transducers, typically referred to as heads. At the center of the rigid substrate is the metallic disk hub 15.

Referring now to FIG. 2, the primary component groups within the disk drive 10 of the present invention include the following. There is the bottom housing 16 in which the base plate 46 rests. In FIG. 2, a spindle motor 61 is shown mounted on the base plate 46. The spindle motor 61 includes a spindle magnet 63 which attracts the metallic disk hub 15 of the disk 14 when the disk cartridge 13 is installed in the disk drive 10. The ejection mechanism of the present invention is shown generally at 67. The ejection mechanism 67 includes a left slider 70, a right slider 73, and a tiller 76. The ejection mechanism 76 is described more fully below. A parking arm 79 is also depicted in FIG. 2 in its position above the left slider 70. The cartridge receiver is shown generally at 82. Also shown in FIG. 2 are the left door link 85, the right door link 88, and the receiver door 91, each of which is pivotally attached to the cartridge receiver 82. The drive face plate 19 is depicted in front of the cartridge receiver 82. Finally, a rotatable, magnetic bias coil assembly 94 is depicted attached to a bias coil arm 97, with bias coil clamps 100 depicted above the bias coil arm. Further details about each of these primary component assemblies will next be provided.

Continuing to refer to FIG. 2, the bottom housing 16 includes side walls 103 and a back wall 106. On the inside base of the bottom housing 16 are four mounting stations 109 to which the base plate 46 is secured. The bottom housing 16 would also encase the control electronics, which are not depicted in the figures.

Figure 3A:
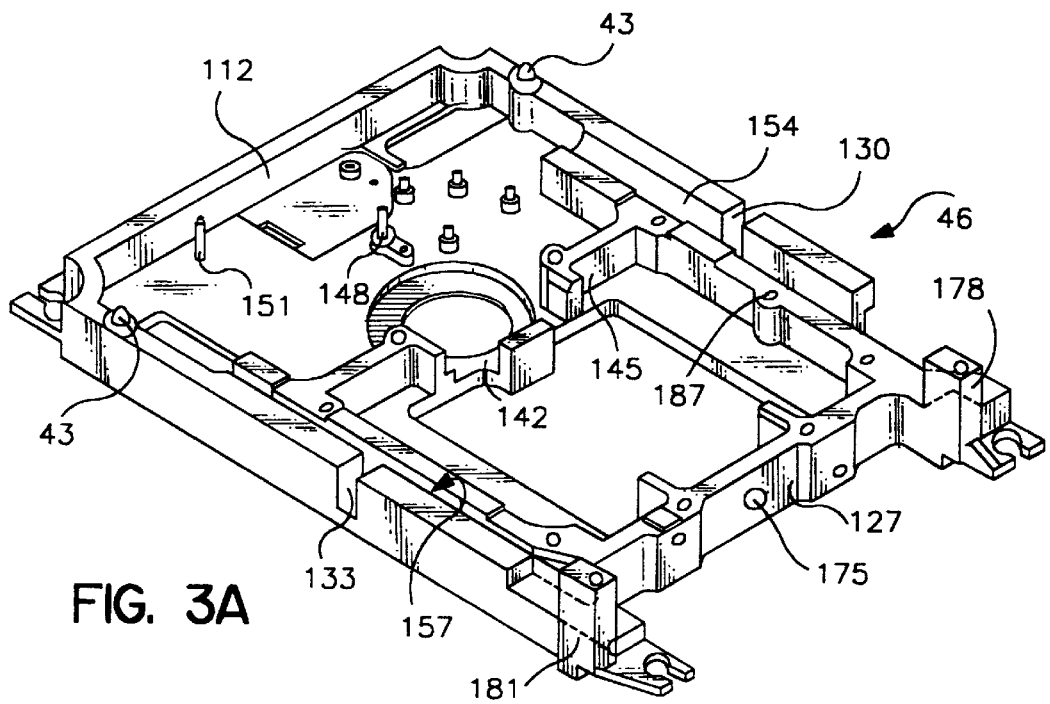
FIGS. 3A–3B are isometric views of the baseplate of the present invention as illustrated in FIG. 2.
Figure 3B:
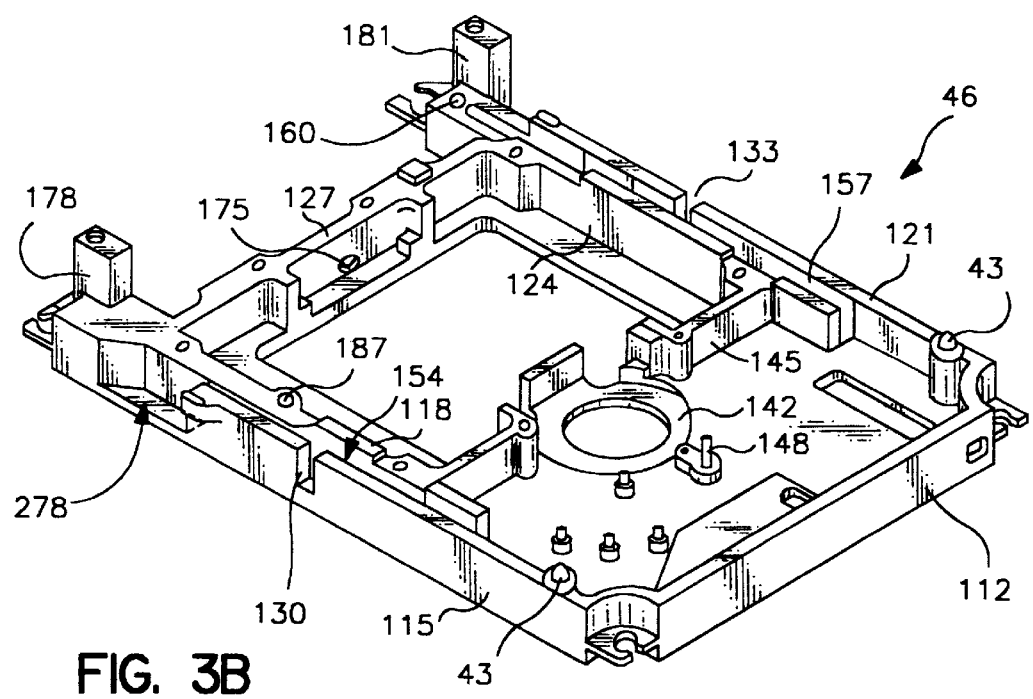

Referring now to FIGS. 3A and 3B, further details of the construction of the base plate 46 will now be provided. The base plate 46 is mounted on the four mounting stations 109 (FIG. 2) of the bottom housing 16. The base plate 46 has many components either molded into, embedded into, attached to, or associated with it. Base plate 46 is the "glue" that brings the many components of this invention together and permits them to interact. Around the periphery of the base plate 46 there is a forward wall 112, a left outer side wall 115, a left inner side wall 118, a right outer side all 121, a right inner side wall 124, and a rear vertical wall 127. The left and right outer side walls 115, 121, respectively, each includes a vertical slot 130, 133, respectively. The left vertical slot 130 accommodates the left lift pin 136 (FIG. 10A) on the cartridge receiver 82 when the cartridge receiver 82 is in place around the base plate 46. The right vertical slot 133 similarly accommodates the right lift pin 139 (FIG. 10B) of the cartridge receiver 82.

The two cartridge locating pins 43 are positioned near the forward ends of the left and right outer side walls 115, 121, respectively. These locating pins 43 are adapted to engage the cartridge channels 40 (FIG. 1). When the pins 43 are located in the channels 40, the pins 43 hold the disk cartridge 13 and prevent it from moving both laterally (i.e., side-to-side) and longitudinally (i.e., forward and backward).

The spindle motor mount 142 is molded into the bottom of the base plate 46. The spindle motor 61 (FIG. 2) may be held on the spindle motor mount 142 by, for example, spring clips (not shown) attached to the intermediate rib 145.

The base plate 46 has various axes and mounting pins associated therewith. For example, a tiller pivot axis 148 is mounted on the base plate 46 adjacent to the spindle motor mount 142. A tiller-spring pin 151 is fixed to the bottom of the base plate 46 near the forward wall 112 (FIG. 3A). The other pins attached to the bottom of the base plate 46 near the forward wall 112 act as pivot shafts for the gears in the ejection gear train.

The base plate 46 also includes a left slider channel 154 and a right slider channel 157. The slider channels 154, 157 extend along the sides of the base plate 46. The left slider channel 154 is formed between the left outer side wall 115 and the left inner side wall 118. When in position, the left slider 70 is sandwiched between the left inner side wall 118 and the left outer side wall 115, and rides in the left slider channel 154 (see, e.g., FIGS. 4, 9B and 11A–B). Similarly, the right slider channel 157 is formed between the right outer side wall 121 and the right inner side wall 124. When in position, the right slider 73 is sandwiched between the right inner side wall 124 and the right outer side wall 121, and rides in the right slider channel 157. The left and right sliders 70, 73, respectively, may be held in their respective channels 154, 157 by, for example, "ears" on the spring clips (not shown) that hold the spindle motor 61 in position on the spindle motor mount 142.

At the end of the right slider channel 157, adjacent to the rear vertical wall 127, a socket 160 is formed in the base plate 46 where the rear of the right inner side wall 124 merges with the rear of the right outer side wall 121. This socket 160 accommodates the pivot pin 163 (FIGS. 12B and 12A) of the receiver latch. 166. The receiver latch 166 has a vertical surface 169 (FIG. 12B) upon which a latch-release trip lug 172 (FIGS. 2 and 11A–B), which is fixed to the right door link 88, impacts to release the receiver latch 166.

The base plate 46 has a port 175 in the rear vertical wall 127. The laser diode (not shown), which would be located behind the rear vertical wall between the left corner pillar 178 and the right corner pillar 181, shines through the port 175 and into the fine actuator assembly carriage 184 (FIGS. 4, 9A–B, and 11A–B), which contains the optics that focus the laser beam on an information track on the disk 14. The carriage 184 is discussed in greater detail below.

Figure 4:
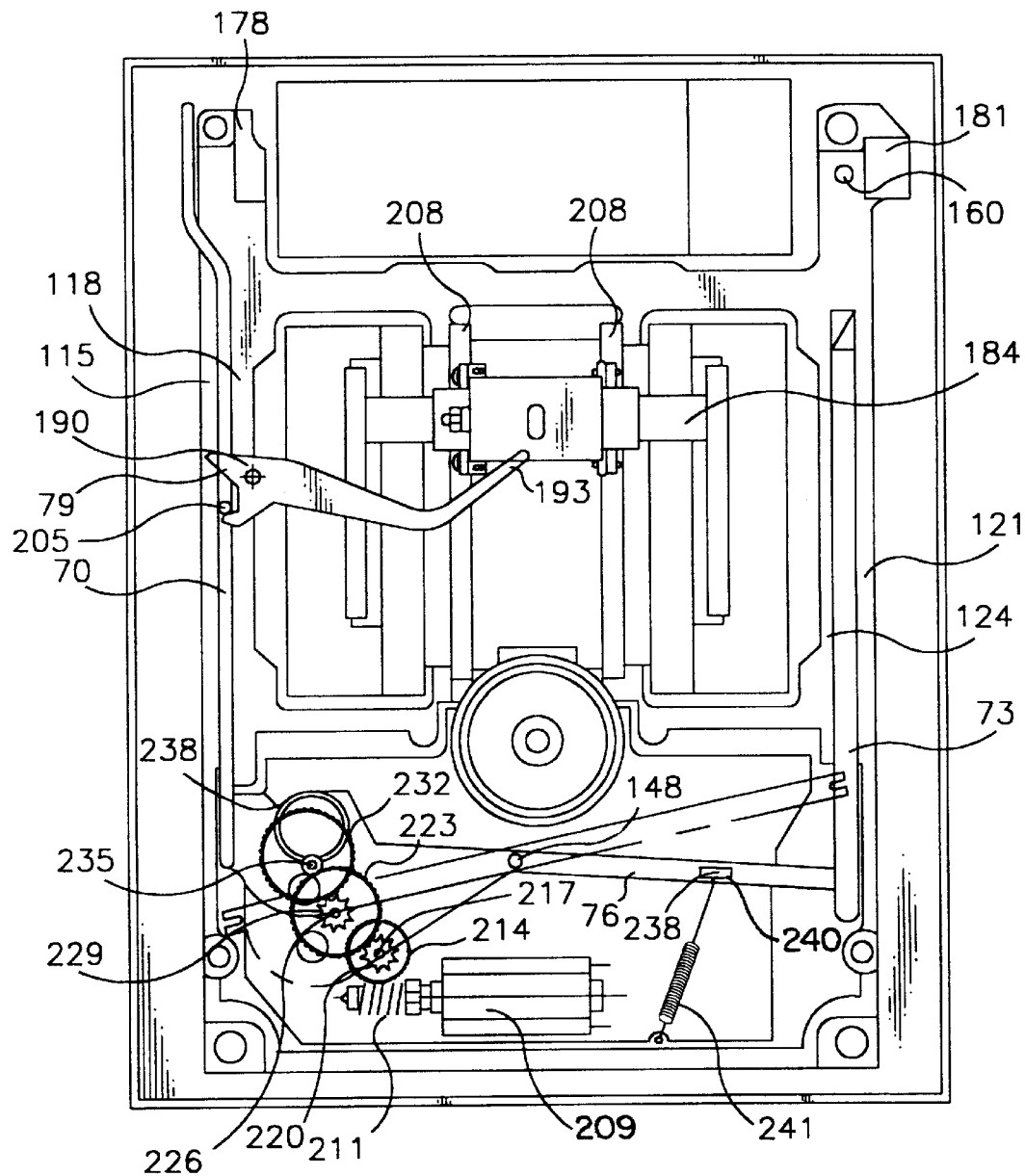
FIG. 4 is a top elevational view of the drive of FIG. 1 with some features removed to better show the tiller, the tiller-driving gears, the motor that drives these gears, and the operative relationship between these features in accordance with this invention.

The base plate 46 also has a hole 187 molded therein (FIG. 3A) to accommodate the pivot shaft 190 of the parking arm 79. This hole 187 is molded as an integral part of the left inner side wall 118. FIG. 4, for example, shows the parking arm 79 in place with its pivot shaft 190 in the hole 187.

Referring now to FIGS. 8A through 8C, further features of the parking arm will be described. In addition to the pivot shaft 190, the parking arm 79 includes a pressing end 193. The parking arm 79 has a jaw 196 formed on the end remote from the pressing end 193. The jaw 196 has a long side 199 and a short side 202. When the parking arm 79 is in position, the jaw 196 straddles the lug 205 (FIG. 6C) on the left slider 70. The parking arm 79 in position, with its jaw 196 straddling the lug 205 of the left slider 70, may be seen to best advantage in FIGS. 4, 9B and 11A–B. The position of the parking arm 79 is thereby dictated by the location of the left slider 70 in the left slider channel 154.

Figure 9A:
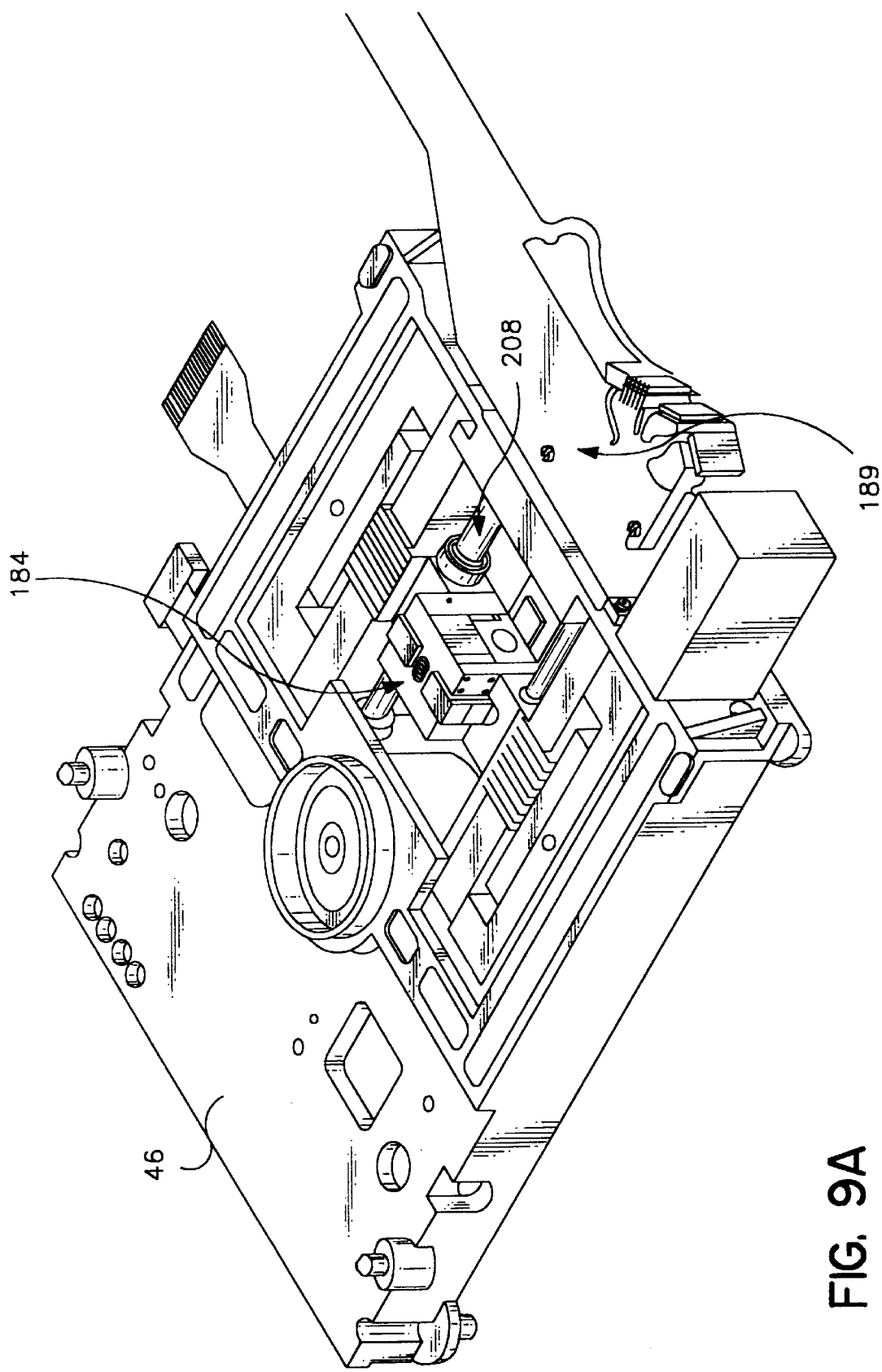
FIG. 9A is an isometric bottom view of the disk drive of FIG. 1, illustrating in particular the fine actuator assembly carriage which supports the optics used to focus the laser beam on the data track of an optical disk as operated in conjunction with this invention.

FIG. 9A shows the carriage 184 which supports the fine actuator assembly and related optics used to focus the laser beam on an information track of the optical disk surface. The fine actuator assembly carriage 184 in particular is of the type employed in the OMA optical drive sold by MOST, Inc., of Colorado Springs, Colo., USA. As understood by those of ordinary skill in the art, carriage 184 contains a 45° mirror (not shown) which redirects a laser beam generated in optics module 189 up through a fine actuator motor-driven focusing lens (not shown) onto the surface of the optical disk. In the perspective view of FIG. 9A, the support rails 208 upon which carriage 184 rides are partially revealed.

Figure 9B:
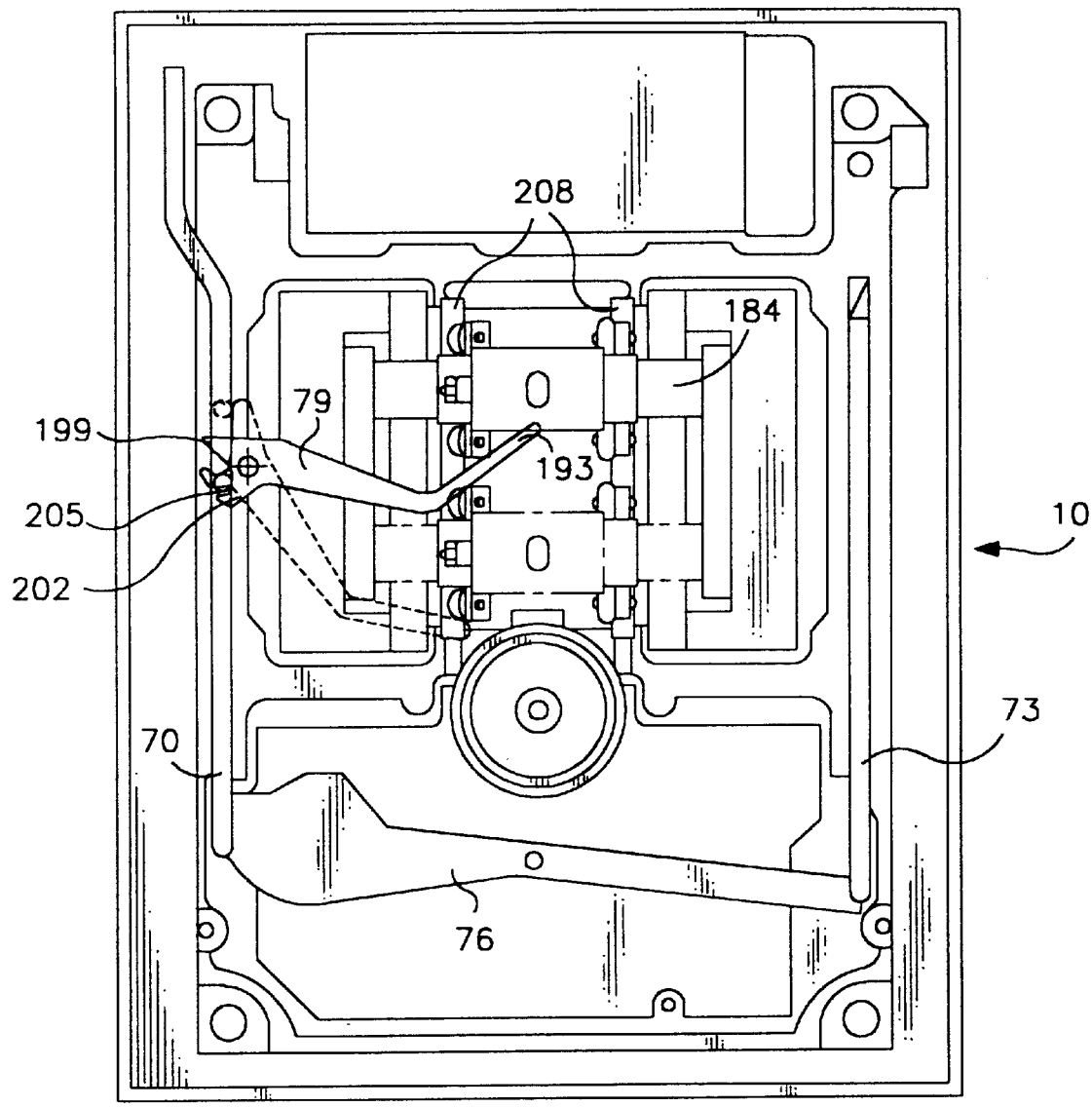
FIG. 9B is an elevational view of the fine actuator assembly carriage parking arm in two positions according to the present invention, one drawn in phantom showing its action of parking the carriage at the back of the drive while the drive is at rest.

As seen to best advantage in FIG. 9B, parking arm 79 parks fine actuator assembly carriage 184. The carriage 184 focuses the laser beam coming from the optics module through the port 175 in the rear vertical wall 127 of the base plate 46. Specifically, the carriage positions the laser beam over the center of a data track containing data to be read. The carriage 184 rides on support rails 208. A conventional magnetic arrangement drives the carriage 184 along the rails 208.

Figure 11B:
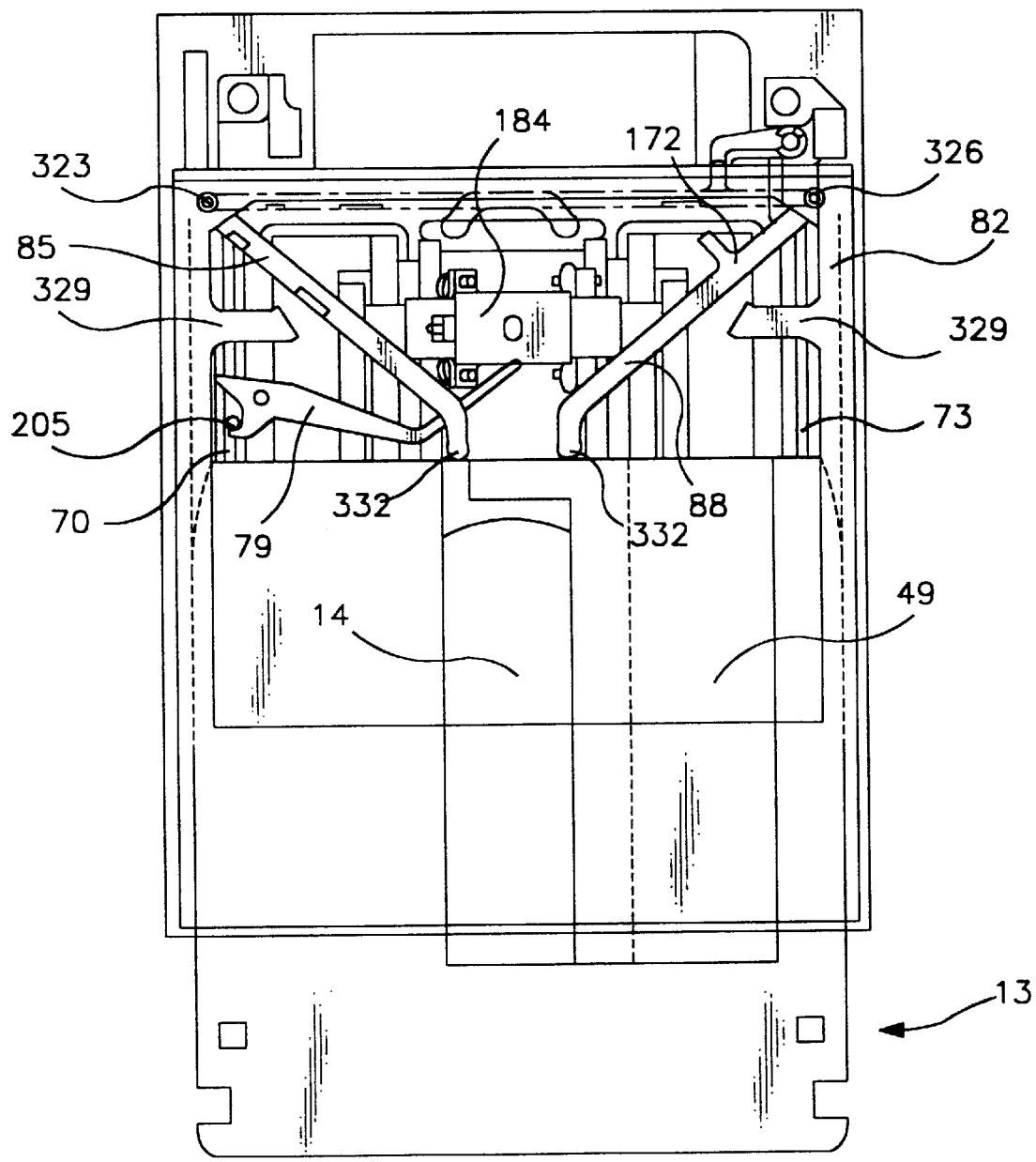
FIG. 11B is an elevational view of the drive FIG. 1, showing the disk cartridge at a further stage of insertion, wherein the cartridge shutter is partially opened by the left door link to reveal the surface of the optical data storage disk.
Figure 14:
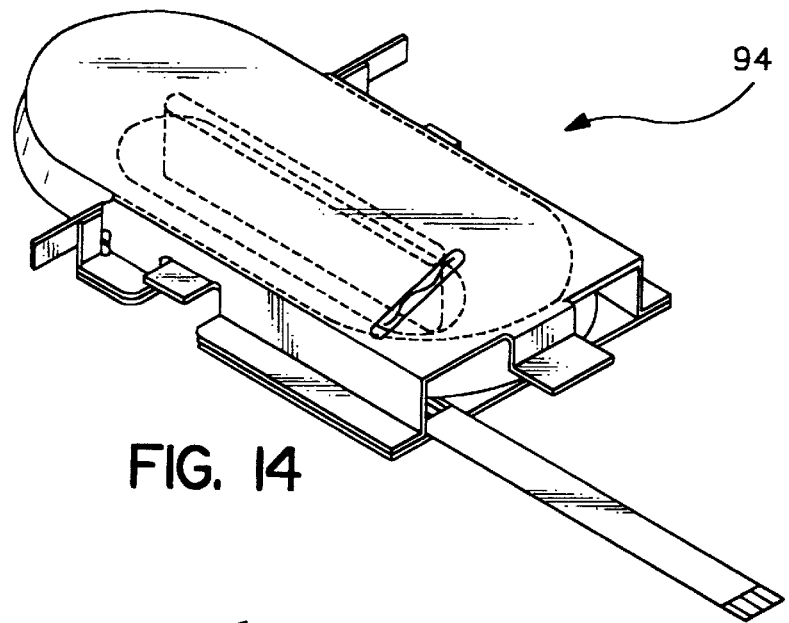
FIG. 14 is an isometric view of a bias coil assembly according to the present invention.
Figure 15:
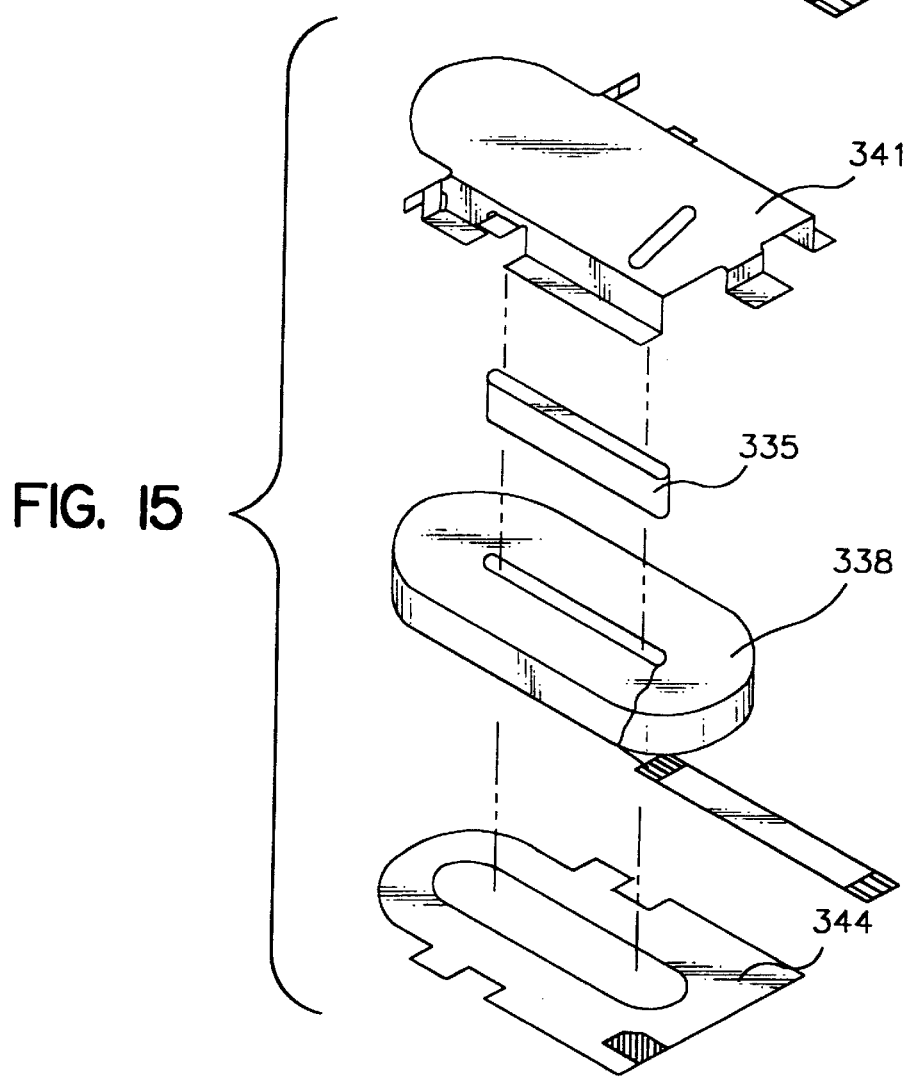
FIG. 15 is an exploded isometric view of the major components forming the bias coil assembly in accordance with this invention.

When the cartridge receiver 82 is in the up condition, the parking arm 79, which is powered by the left slider 70, holds the carriage 184 toward the rear of the drive. This condition is illustrated in FIGS. 4 and 11A–B, and is seen again in FIG. 9B where the parking arm 79 shown in solid lines. When the left slider 70 is driven forward by the tiller 76 during ejection of the disk cartridge 13, the parking arm 79 is rotated by the lug 205 pressing against the short side 202 of the jaw 196 until the pressing end 193 of the parking arm 79 holds the carriage 184 toward the back of the disk drive 10. When the cartridge receiver 82 is in its down position, the left slider 70 has been driven toward the rear of the disk drive 10 by the tiller 76. Under this scenario, the lug 205, which was driven rearward with the left slider 70, has rotated the parking arm 79 toward the front of the disk drive 10, as shown in phantom in FIG. 9B. With the left slider 70 and parking arm 79 in these positions, the carriage 184 is not influenced by the pressing end 193 of the parking arm 79 and may move freely above the disk 14 in the disk drive 10.

The ejection mechanism 67, which may be seen to best advantage in FIGS. 2 and 4, includes the following key features. An ejection motor 209 powers the ejection mechanism. In particular, the ejection motor 209 powers a gear train that powers the output cam which, in turn, forces the tiller to rotate in a first direction (counterclockwise in FIG. 4), thereby ejecting a disk cartridge 13 from the disk drive 10. When user initiates the ejection process, the motor 209 drives the worm gear 211. The worm gear 211 is fixed to the central shaft of the ejection motor 209. This worm gear 211 drives a first large gear 214 about a first axis 217. This rotation of the first large gear 214 rotates a first small gear 220, which is fixed to the bottom of the first large gear 214 for rotation therewith about the first gear axis 217. The first small gear 220 drives a second large gear 223 about a second gear axis 226. A second small gear 229 is fixed to the top of the second large gear for rotation therewith about the second gear axis 226. The second small gear 229, in turn, drives a third large gear 232 about a third gear axis 235. The third large gear 232 drives the cam 238 that forces the tiller 76 to rotate about the tiller axis 148.

The tiller 76 will now be described with reference to FIGS. 5A–5F and FIG. 4. The tiller 76 is pivotally attached to the base plate 46 by the tiller axis 148. A tiller-spring hook 240 is molded on the slender portion of the tiller 76. A tiller spring 241 (FIG. 4) is attached between the tiller-spring hook 240 and the tiller-spring pin 151 (FIG. 3A). The tiller-spring 241 biases the tiller 76 in a second direction (clockwise in FIG. 4) about the tiller axis 148. This is the cartridge-loading direction, which drives the right slider 73 forward and the left slider 70 rearward, to seat the disk cartridge 13 on the spindle motor 61.

The tiller further includes a tiller skirt or webbed portion 244 that rides on top of the tiller gear train and thereby helps to contain the ejection gears in position on their respective gear axes. The end of the tiller near the tiller skirt 244 includes a U-shaped jaw 247, and the tiller end remote from the skirt 244 includes a similar U-shaped jaw 250. The U-shaped jaw 247 fits rotatably around the cylindrical connection post of the left slider 70 (FIG. 6C). Similarly, the U-shaped jaw 250 of the tiller 76 fits rotatably around the cylindrical connection post 256 (FIG. 7E) of the right slider 73. The tiller 76 is thereby pivotally connected to the forward ends of the left and right sliders 70, 73, respectively. In addition, since the left and right sliders 70, 73 are held in their respective slider channels 154, 157 by the spring clips (not shown) which also hold the spindle motor 61 in position, the tiller 76 is held on the tiller axis 148 by the interaction between the U-shaped jaws 247, 250 and the cylindrical connecting posts 153, 156.

When the tiller 76 rotates in a first direction (counterclockwise in FIG. 4), the left slider 70 is driven forward in the left slider channel 154, while the right slider 73 is simultaneously driven rearward in the right slider channel 157. Thus, rotation of the tiller 76 in the first direction (counterclockwise in FIG. 4) raises the cartridge receiver 82 so that a disk cartridge 13 may be ejected from or loaded into the disk drive 10. On the other hand, when the tiller 76 rotates in a second direction (clockwise in FIG. 4), the left slider 70 is driven rearward in the left slider channel 154, while the right slider 73 is simultaneously driven forward in the right slider channel 157. Rotation of the tiller 76 in this direction lowers the cartridge receiver 82, placing the disk on the spindle motor. The raising and lowering of the cartridge receiver 82 by the rotation of the tiller 76 is discussed further below.

As discussed above, the left slider 70 rides in the left slider channel 154, and the right slider 73 rides in the right slider channel 157 under the influence of the tiller 76. Further details concerning the sliders 70, 73 is provided next.

Figure 6A:
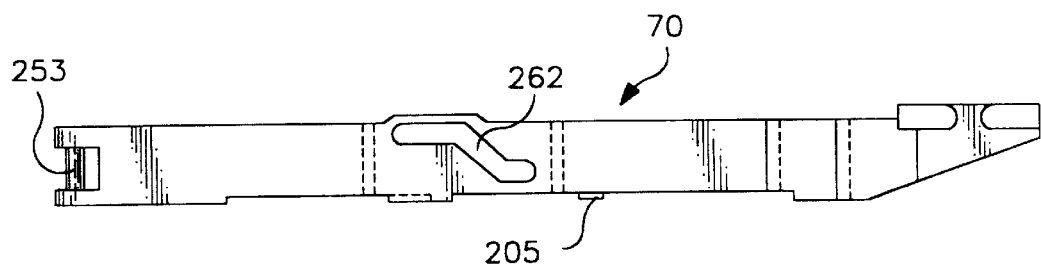
FIGS. 6A–6C include elevational and isometric views of a left slider as utilized in accordance with this invention.
Figure 6B:
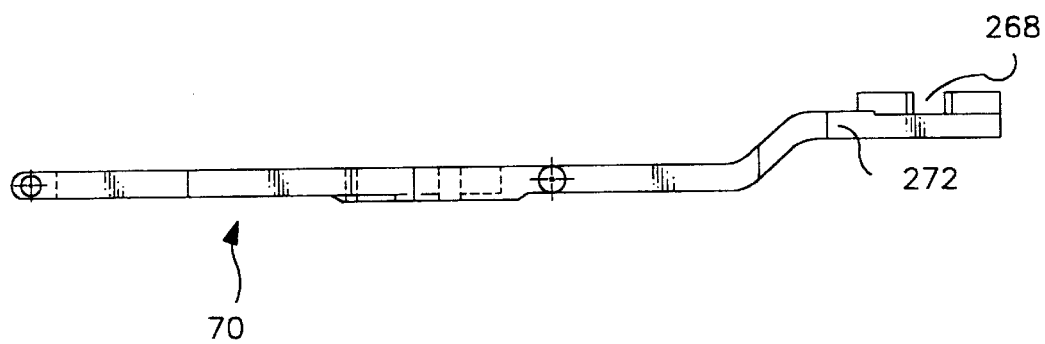
Figure 6C:
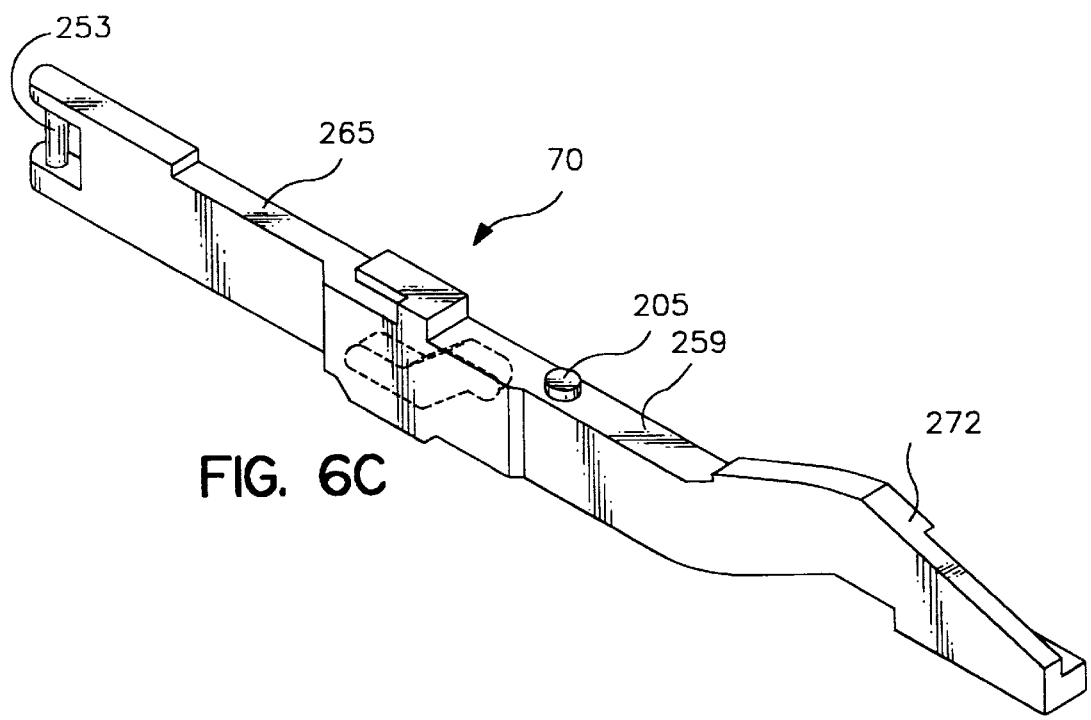
Figure 7A:
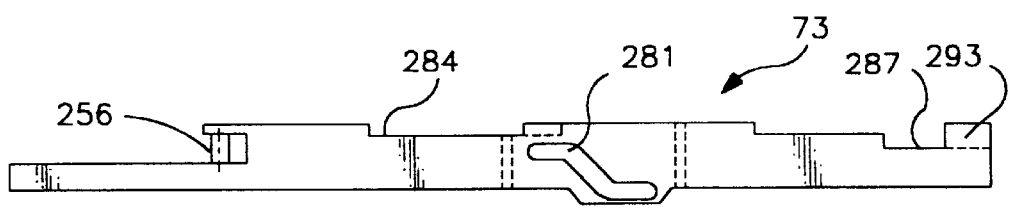
FIGS. 7A–7E show elevational and isometric views of a right slider as utilized according to the present invention.
Figure 7B:
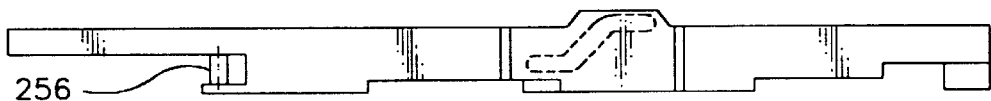
Figure 7C:
Figure 7D:
Figure 7E:
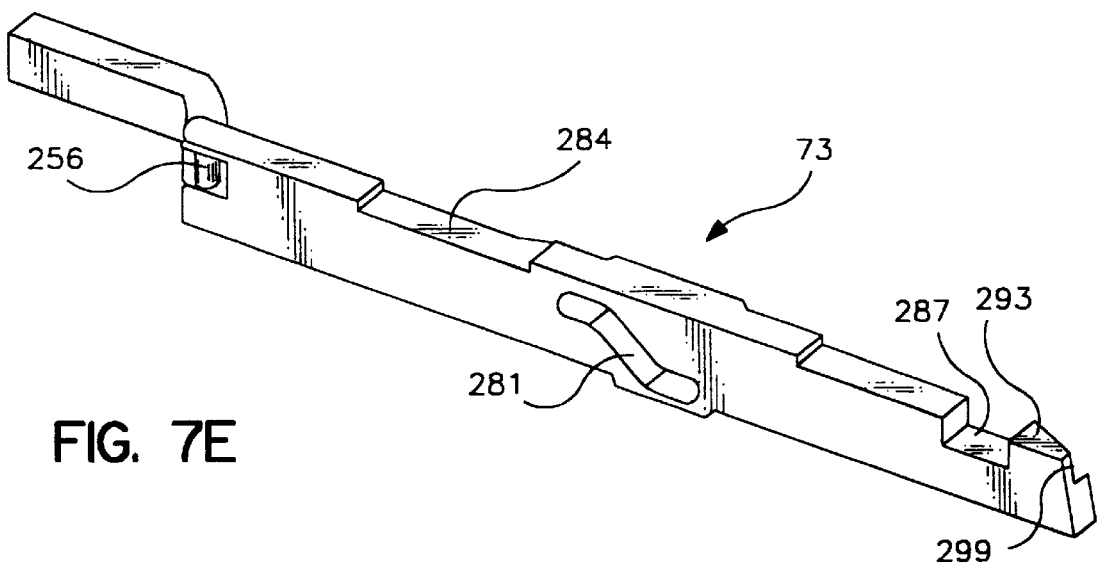

Referring now to FIGS. 6A–6C, the features of the left slider 70 are as follows. The left slider includes the cylindrical connecting post 253 on its forward end. The parking arm lug 205 exists on a fist recessed portion 259. The parking arm 79 slides along the first recessed portion 259 of the left slider 70 under the influence of the lug 205. An S-shaped slot 262 is formed into the left slider 70. When the left slider 70 is in position in the left slider channel 154, the S-shaped slot 162 opens toward the left outer side wall 115, adjacent to and behind the left vertical slot 130. When the cartridge receiver 82 is in position around the base plate 46, the left lift pin 136 (FIG. 10A) of the cartridge receiver 82 rides in the left vertical slot 130 of the base plate 46. The left lift pin is longer than the left outer side wall 115 is thick. Therefore, the left lift pin 136 projects through the left vertical slot 130 and rides in the S-shaped slot 262 in the left slider 70.

When the cartridge receiver 82 is thus positioned about the base plate 46, with the left lift pin 136 riding in the vertical slot 130 and the S-shaped slot 262, the cartridge receiver 82 is restricted from traveling forward or backward and may only travel up and down vertically. The vertical slot 130 restricts the forward-to-backward movement of the cartridge receiver 82, while the S-shaped slot 262 in the left slider 70 defines the vertical height of the cartridge receiver. In other words, depending upon which portion of the S-shaped slot 262 is behind the vertical slot 133 at any particular moment, the cartridge receiver 82 may be in its highest position, its lowest position, or at some position between its highest and lowest positions.

A second recessed portion 265 is present on the top of the left slider 70, FIG. 6C. A horizontal pin (not shown) may be attached to the base plate 46 so as to slip along the second recessed portion 265. This horizontal pin (not shown) would limit the most forward and most rearward positions of the left slider because the pin would impact the edges of the second recessed portion 265 upon reaching one of the extreme positions of the left slider.

The rear-most end of the left slider 70 includes a notch 268, which may be seen to good advantage in both FIG. 6B and FIG. 2. The notch 268 is located on a displaced portion 272 of the left slider 70. The notch 268 receives the lever arm 275 of the bias coil arm 97, FIGS. 2 and 16. This lever arm 275 rotates the bias coil arm 97 depending upon the position of the left slider 70, and in particular, the position of the notch 268. The displaced portion 272 of the left slider 70 rides in a recess 278 (FIG. 3B) in the left outer side wall 115 of the base plate 46.

Referring now to FIGS. 7A–7E, the features of the right slider 73 will be presented. As stated above, the tiller 76 is connected to the right slider 73 via the cylindrical connection post 256. The right slider 73 has an S-shaped slot 281 formed therein. This S-shaped slot 281 is a flipped version of the S-shaped slot 262 in the left slider 70. This may be seen to best advantage in FIG. 2. In FIG. 2, it is apparent that, when the sliders 70, 73 are connected to the tiller 76, the S-shaped slots 262, 281 are flipped mirror images of each other. This arrangement is necessary since the sliders 70, 73 move in opposite directions under the influence of the tiller 76. The S-shaped slot 281 in the right slider 73 also opens toward the right outer side wall when the right slider 73 is in its operating position in the right slider channel 157.

Similar to what was described above with reference to the left slider 70, when the cartridge receiver 82 is in position around the base plate 46, the right lift pin 139 (FIG. 10B) rides in the right vertical slot 133 (FIG. 3B). Since the right lift pin 139 is longer than the right outer side wall 121 is thick, the right lift pin 139 projects through the right outer side wall 121 at the right vertical slot 133 and rides in the S-shaped slot 281 in the right slider 73. The right vertical slot 133 restricts the right lifting pin 139 from traveling parallel to the longitudinal axis of the base plate 46 (i.e., parallel to a line passing perpendicularly through the forward wall 112 and the rear vertical wall 127). Since the right lift pin 139 rides in the S-shaped slot 281, the vertical height of the cartridge receiver 82 is defined by the location of the right lift pin 139 in the S-shaped slot 281. The S-shaped slot 281 in the right slider 73 travels behind the right vertical slot 133 at the same rate that the S-shaped slot 262 in the left slider 70 passes behind the left vertical slot 130, but in an opposite direction. The flipped mirror image design of the S-shaped slots 262, 281, however, ensures that the left and right lift pins 136, 139, respectively, are held at substantially the same vertical height above the bottom of the base plate 46 at any particular time.

Still referring primarily to FIGS. 7A–7E, the right slider includes the following additional features. A recessed portion 284 is present on the top surface of the right slider 73. A pin (not shown) may be mounted horizontally across the right slider channel 157 so as to slide along the recessed surface 284. The horizontal pin sliding along the recessed surface 284 would limit the maximum forward and rearward travel of the right slider 73 since the horizontal pin would hit the edges of the recess 284 at the extremes of travel of the right slider 73. The right slider 73 also includes a notched region 287 to accommodate a paw 290 (FIGS. 12A and 12B) of the receiver latch 166. A raised portion 293 is present on the rear end of the right slider 73.

When the tiller 76 rotates in the first direction (counterclockwise in, for example, FIG. 9B), driving the right slider 73 rearward in the right slider channel 157, a latching action takes place between the paw 290 of the receiver latch 166 and the raised portion 293 of the right slider 73. In particular, a first slipping surface 296 (FIG. 12A), which is located on the paw 290, slides past a second slipping surface 299 (FIGS. 7C and 7E), which is on the raised portion 293 of the right slider 73. When the surfaces 296, 299 slip past each other, the paw 290, which is spring-loaded in the direction indicated by the arrow 302 in FIG. 12A, enters the notched region 287 of the right slider 73, which holds the right slider 73 in the rearward position and, consequently, holds the cartridge receiver 82 in its uppermost position. When the cartridge receiver is in this position, any disk cartridge 13 in the drive 10 would be ejected or, alternatively, a disk cartridge 13 could be loaded into the disk drive 10.

The S-shaped slots 262, 281 in the left and right sliders 70, 73, respectively, play a significant role in generating the peeling action accomplished by the present invention when loading a disk cartridge onto and unloading a disk cartridge from the spindle motor. This role of the S-shaped slots 262, 281 in facilitating the peeling action generated by this invention is discussed further below.

Referring now to FIGS. 10A and 10B, the cartridge receiver and the components attached to it will be described. The cartridge receiver 82 is preferably a one-piece, injection molded piece of plastic to which the left door link 85 (FIG. 2) and right door link 88 are added. When the disk drive 10 is fully assembled, the cartridge receiver 82 rides on the outside of the left and right outer side walls 115, 121 of the base plate 46. The cartridge receiver 82 travels vertically up and down as the lift pins 136, 139 move up and down as they follow their respective S-shaped slots 262, 281. The cartridge receiver 82 also pitches slightly up and down about an imaginary lateral axis passing through the left and right lift pins 136, 139. It is this slight pitching motion in conjunction with the up and down motion that generates the beneficial peeling action achieved by the instant invention. The cartridge receiver 82 may be snapped or lifted off of the remainder of the mechanism if the cover of the disk drive 10 is removed.

The cartridge receiver 82 has a left cartridge receiving channel 305 and a right cartridge receiving channel 308 formed therein. A stop bumper 311 is positioned in the rear of the right cartridge-receiving channel 308 to prevent improper insertion of a disk cartridge 13. As may be seen in FIGS. 1 and 2, the disk cartridge 13 has a pair of slots 314 molded into the side walls 37. If the disk cartridge 13 is inserted correctly, with its rear wall 38 entering the disk receiving port 22 first, one of the slots 314 in the disk cartridge 13 will accommodate the stop bumper 311 and permit the cartridge 13 to be fully inserted into the drive 10. If, on the other hand, the user inserts the disk cartridge 13 with the forward-facing label end 34 entering the disk receiving port 22 first, the stop bumper 311 will impact the label end 34 of the disk cartridge 13, thereby preventing full insertion of the disk cartridge 13 into the disk drive 10.

The rear wall 317 of the cartridge receiver 82 has a notched region 320 formed therein. This notched region permits the latch-release trip lug 172 (FIGS. 11A–B) fixed to the right door link 88 to affect the vertical surface 169 (FIG. 12B) of the receiver latch 166. Since the left and right door links 85, 88, respectively, are rotated toward the rear of the disk drive 10 as the disk cartridge 13 is inserted in the cartridge receiver 82, as the disk cartridge 13 approaches full insertion, the trip lug 172 trips the receiver latch 166 by pressing against the vertical surface 169 to rotate the receiver latch 166. This rotation of the receiver latch 166 frees the paw 290 from its latched position around the raised portion 293 of the right slider 73. When the receiver latch 166 is tripped in this manner, the cartridge receiver 182 can be lowered, placing the disk cartridge 13 in operating position on the spindle motor 61.

Referring to FIGS. 2, 10A–B and 11A–B, the attachment of the left door link 85 and the right door link 88 to the receiver cartridge 82 will now be described. The left and right door links 85, 88 are attached to the rear corners of the cartridge receiver 82, near the rear wall 317. Specifically, the left door link 85 is rotatably mounted to the cartridge receiver 82 at a first pivot point 323, and the right door link 88 is rotatably mounted to the cartridge receiver 82 at a second pivot point 326. The door links 85, 88 are biased by a spring (not shown) toward the face plate 19 of the disk drive 10.

In operation, one or the other of the door links 85, 88 unlatches the cartridge shutter lock and opens the cartridge shutter 49 as the disk cartridge 13 is inserted into the drive 10. Whether the left door link 85 or the right door link 88 opens the cartridge shutter 49 is determined by which side of the disk cartridge 13 is facing up when the cartridge 13 is inserted into the drive 10. If the disk cartridge 13 is inserted with the first side up, the right door link 88 operates the shutter latch and opens the shutter 49. If the disk cartridge 13 is inserted with its other side up, the left door link 85 operates the shutter latch and opens the shutter 49. When no disk cartridge 13 is in the drive 10, the door links 85, 88 rest against door link stops 329, which are integrally formed as part of the cartridge receiver 82. These door link stops 329 ensure that the free ends 332 of the door links 85, 88 are properly positioned to release the shutter latch and open the shutter 49 as the disk cartridge 13 is inserted into the drive 10.

FIG. 11B shows the disk cartridge 13 inserted into drive 10 to a depth such that free end 332 of door link 85 has begun to open shutter 49, revealing the surface of optical disk 14.

Referring now to FIGS. 14–17, the rotatable, magnetic bias coil assembly 94 will be more fully described. The bias coil assembly 94 is used during writing and erasing operations of the disk drive 10. The bias coil assembly 94 includes a steel bar 335 wrapped in a coil of wire 338. When the bias coil assembly 94 is positioned over a disk 14, as shown to best advantage in FIG. 18, it extends radially across the disk 14 and is thus capable of generating a strong magnetic field over a radial strip of the disk 14, extending from near the spindle 62 (FIGS. 18–20) to the edge of the disk 14. When the disk 14 is rotated under the bias coil assembly 94 by the spindle motor 61, it is possible to generate a magnetic field over the entire surface of the disk 14, thus enabling the user to write information to all portions of the disk 14 from its innermost to its outermost tracks. The coil 338 and bar 335 are covered by a bias coil housing top 341, which is mounted to a bias coil housing bottom 344.

Figure 16:
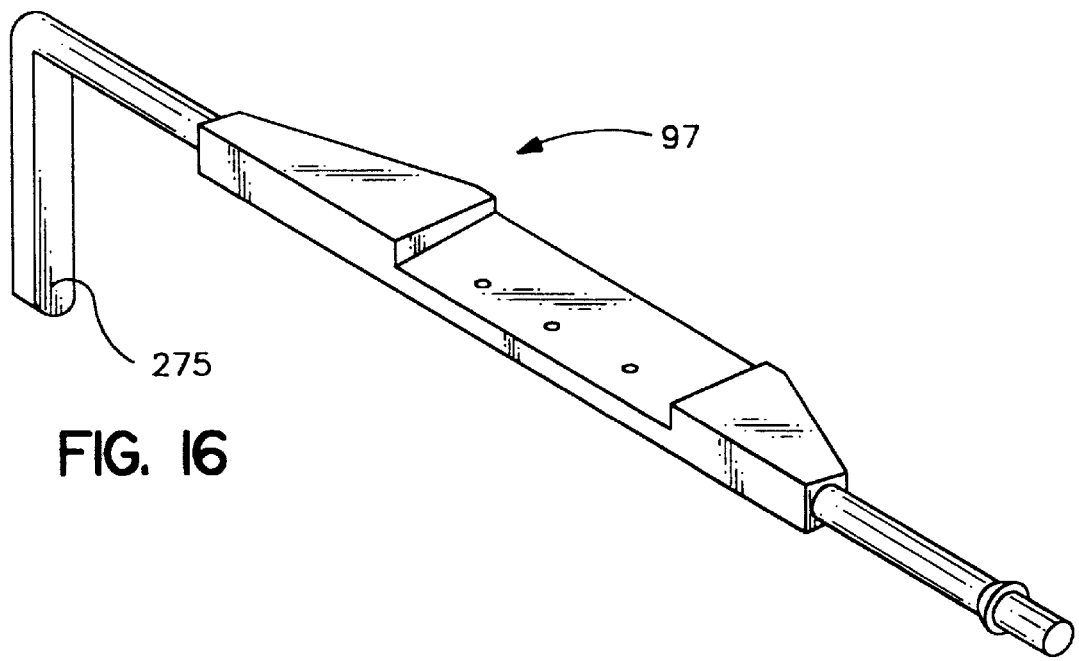
FIG. 16 is an isometric view of a pivot bar or rail that rotatably supports the bias coil assembly shown in FIGS. 14 and 15.
Figure 17:
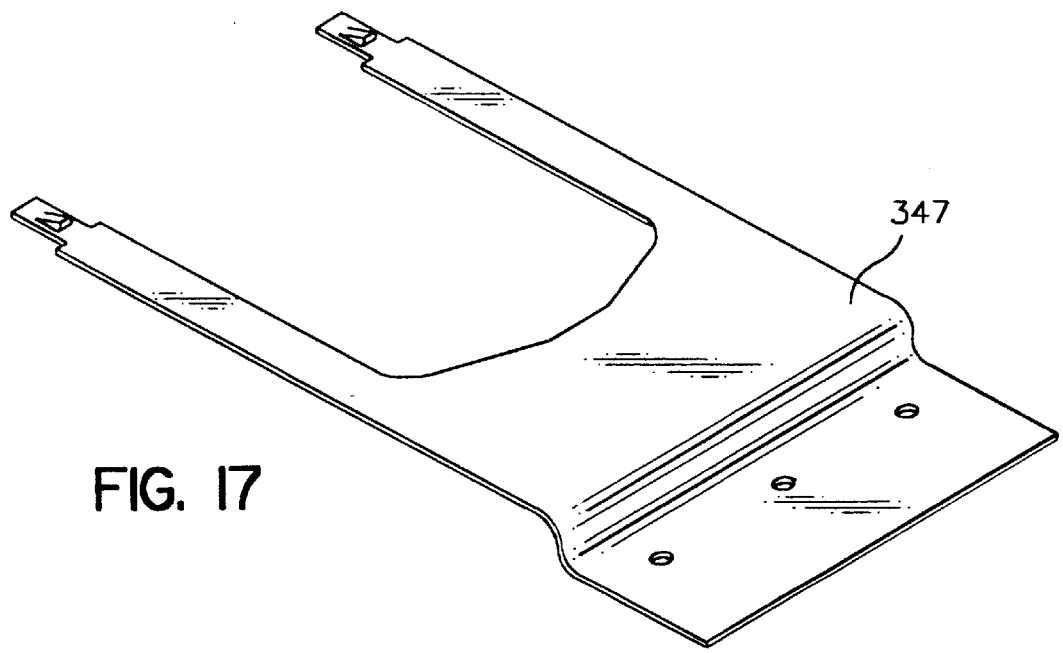
FIG. 17 is an isometric view of the bias coil assembly flexure to which the bias coil assembly is mounted and which is in turn mounted to the pivot bar depicted in FIG. 16.

The bias coil assembly 94 is mounted to the bias coil flexure 347 (FIG. 17), which is, in turn, mounted on the bias coil arm 97 (FIG. 16). The bias coil arm 97 straddles the width of the base plate 46 and is rotatably held by a pair of bias coil clamps 100 (FIG. 13) to the corner pillars 178, 181 (FIGS. 3A and 3B) of the base plate 46. The bias coil clamps 100 thus act as bearing blocks under which the bias coil arm 97 can rotate. The bias coil clamps 100 include a stop ledge 350, which terminates the upward travel of the cartridge receiver 82 during an ejection operation, as discussed more fully below with reference to FIGS. 18–20. As previously discussed, the bias coil arm 97 includes a lever arm 275 in operative association with the notch 268, FIG. 6B, on the rearward end of the left slider 70 to lift and lower the bias coil assembly 94. Since the lever arm 275 engages the notch 268 in the left slider 70, the left slider 70 controls when the bias coil assembly 94 is rotated onto or off of the disk cartridge 13.

Figure 18:
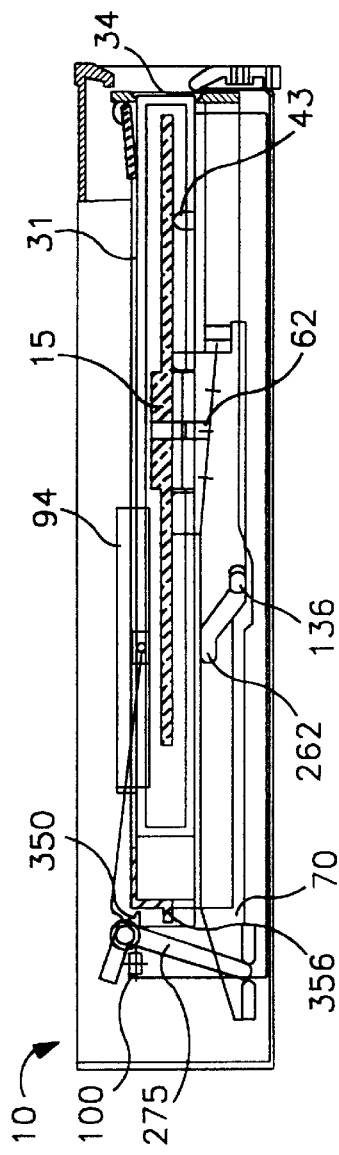
FIG. 18 is an elevational view of the right side of the cartridge receiver and the cartridge just before initiation of an cartridge-eject cycle, depicting the disk mounted in operating position on the spindle.
Figure 19:
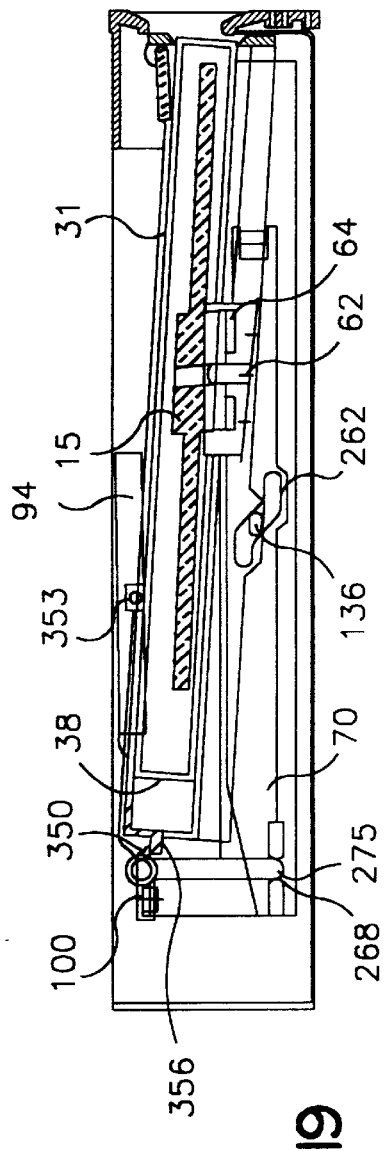
FIG. 19 is an elevational view of the right side of the cartridge receiver and the cartridge during the cartridge-eject cycle, showing the cartridge being tipped and the disk being peeled off the spindle according to the present invention.
Figure 20:
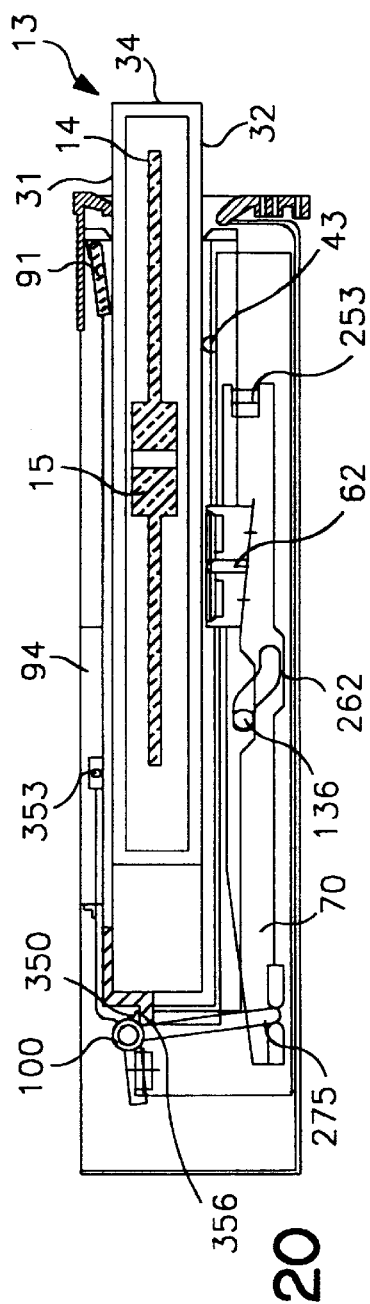
FIG. 20 is an elevational view of the right side of the cartridge receiver and the cartridge during the cartridge-eject cycle, illustrating the cartridge loading system in the up position and the disk starting to be ejected from the disk drive.

The bias coil assembly 94 may tilt or rotate about a point 353 near its center, and it is spring-loaded downward, as shown in FIGS. 19 and 20. In this manner, the bias coil assembly 94 can remain parallel to the disk cartridge 13 when in the down condition (i.e., the position depicted in FIG. 18, wherein the disk cartridge 13 is fully loaded), and when in the up condition (i.e., the position depicted in FIG. 20, wherein the disk cartridge 13 is unloaded). The ability of the bias coil assembly 94 to remain parallel to the disk cartridge 13 when in the up condition provides the clearance needed for the drive 10 to be able to complete a disk-ejection operation, as discussed below. When in the down condition and loaded in the disk cartridge 13, the bias coil assembly 94 rests on the disk cartridge 13 in three places.

Referring now to FIGS. 18–20, the ejection of a disk cartridge 13 from the disk drive 10 will be described. FIG. 18 depicts a disk cartridge 13 with the disk hub 15 fully loaded onto the spindle 62 of the spindle motor 61. In this configuration, the bias coil assembly 94 is loaded into the disk cartridge 13 through the open shutter 49. When the disk cartridge 13 is fully loaded in this manner, the left slider 70 has been slid to its most rearward position by the tiller 76. The lever arm 275 of the bias coil arm 97 has been rotated toward the rear of the disk drive 10. It is this rotation of the lever arm 275 which has installed the bias coil assembly 94 into the disk cartridge 13. Since the lift pins 136, 139 of the cartridge receiver 82 are restrained to only vertical movement by the vertical slots 130, 133 (FIGS. 3A and 3B), when the left slider 70 has been driven toward the rear of the disk drive 10 by the tiller 76, as depicted in FIG. 18, the cartridge receiver 82, via its lift pins 133, 136, has been driven to the lowest point in the S-shaped slots 262, 281.

Referring now to FIG. 19, an intermediate stage of the ejection cycle will now be described. After a user initiates the ejection of the disk drive 10, the ejection motor 209 (FIG. 4) rotates the tiller 76 in a first direction (counterclockwise in FIG. 4). This rotation of the tiller pulls the left slider 70 toward the front of the drive 10, as depicted in FIG. 19. As the left slider 70 slides forward, the notch 268 rotates the lever arm 275 forward, thereby lifting the bias coil assembly 94 out of the disk cartridge 13. As may also be seen from FIG. 19, the lift pins 136, 139, which are fixed to the cartridge receiver 82, are being forced up the S-shaped slots 262, 281 by the motion of the tiller 76. Since the lift pins 136, 139 are positioned on the cartridge receiver at a point where a lateral axis passing through both lift pins 136, 139 would not also pass through the spindle 62, a "peeling" action for removal of the disk hub 15 from the spindle magnet 64 is achieved as the cartridge receiver 82 is raised. In other words, as depicted in FIG. 19, the disk 14 is not lifted vertically from the spindle 62 during the ejection cycle. Rather, due to the location of the lift pins 136, 139 on the cartridge receiver 82, the rear portion of the disk cartridge 13 is lifted before the forward end of the disk cartridge 13 as the lift pins 136, 139 follow their respective S-shaped slots 262, 281. The peeling action lowers the peak force required to remove the disk hub 15 from the magnetic clamp 64 of the spindle motor 61.

Referring still to FIG. 19, it is apparent that after the cartridge receiver 82 has been lifted a predetermined amount by the motion of the sliders 70, 73, a lip 356 (see FIG. 10A also) on the rear wall 317 of the cartridge receiver 82 impacts the lower surface of the stop ledge 350 on the bias coil clamps 100. This contact between the bottom surface of the stop ledge 350 and the top surface of the lip 356, in conjunction with the continued rotation of the tiller 76 and the resulting longitudinal motion of the sliders 70, 73, causes the cartridge receiver 82 to pitch slightly upward in FIG. 19, substantially about the point of contact between the stop ledge 350 and the lip 356, as the lift pins 136, 139 continue to pick up the receiver. This slight pitching motion of the cartridge receiver 82 effects the "peeling" action referred to above.

FIG. 20 depicts the configuration of the disk drive 10 after the slight upward pitching of the cartridge receiver 82 is complete and the cartridge receiver 82 has impacted the stops adjacent to the disk receiving port 22. At this point, the left slider 70 has reached its furthest forward position and has pulled the lever arm 275 to its furthest forward position, thereby rotating the bias coil assembly 94 out of the disk cartridge 13. The bias coil assembly is thus parked parallel to the above disk cartridge 13, substantially against the inside of the top surface of the disk drive 10 or substantially against a printed circuit board located against the inside of the top surface of the disk drive 10. The bias coil assembly 94 travels vertically about 9 mm from its loaded position in the disk cartridge 13 to its just-described raised position.

As the cartridge receiver 82 is raised to its highest position (about 5 mm above its lowest position), the right slider 73 (FIGS. 7A–7E) is latched in its rear-most position by the receiver latch 166 (FIGS. 12A and 12B), as fully described above. When the cartridge receiver 82 is in the up position depicted in FIG. 20, the cartridge receiver 82 is positioned parallel to the base plate 46, ready for the cartridge 13 to be ejected. The spring force of the door links 85, 88, which are biased toward the forward end of the disk drive 10 as described above, and the spring force of the cartridge shutter 49, which is biased toward a closed position, cause the disk cartridge 13 to be ejected from the disk drive 10, as depicted in FIG. 20.

The disk loading process is essentially the reverse of the above described ejection process. Therefore, a detailed description of the disk insertion process will not be provided.

In the present invention, where the disk hub 15 is peeled from the spindle magnet 64, the required ejection force is effectively reduced by the manner in which the disk 14 is moved from the loaded position to the unloaded position. Through the use of the "peeling" motion of the instant invention, a smaller force is required to remove the disk hub 15 than is required in conventional, vertical-lifting systems. In addition, the design conserves overall drive height. The above-described design accomplishes the peeling of the disk hub 15 from the spindle magnet 64 with a mechanism that uses available space at the sides of the drive 10, rather than requiring parts that straddle the width of the base plate 46 to tie the motion of both sides of a cartridge receiver 82 together and using additional height to do so. Another advantageous feature of the design is the noncritical nature of most of the dimensions required.

Further, the bias coil actuating mechanism that loads the bias coil assembly into the cartridge 13 is simple and has almost no wear points. The entire design is easy to assemble and for the most part can be executed using simple and easy to fabricate parts.

While what has been described above is a preferred embodiment of this invention, it will be apparent to those skilled in the art that numerous changes may be made without departing from the spirit or scope of the invention. For example, the instant invention may be used for media systems which do not require the bias coil assembly 94 (i.e., phase change or write once systems), by eliminating the parts used to operate the bias coil arm 97. In addition, although in the preferred embodiment the storage media is a 5¼ inch magneto-optic disk cartridge, the invention is applicable to all types of media and all sizes of drives.

It is intended that all matter contained in the above description or shown in the accompanying drawing figures, shall be interpreted as being illustrative only and not limiting. Furthermore, since this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

We claim:

1. A cartridge unloading apparatus for a disk drive having a cartridge loading end, a remote end, and a base plate, the apparatus for tiltably unloading a disk from a spindle magnet with a peeling action, the apparatus comprising in combination:

a first slider having a forward end adjacent the cartridge loading end of the disk drive and a remote end adjacent the remote end of the disk drive, said first slider further having only one S-shaped slot formed therein;

a second slider having a forward end adjacent the cartridge loading end of the disk drive and a remote end adjacent the remote end of the disk drive, said second slider further having only one S-shaped slot formed therein;

a tiller having a first end and a second end, said first end of said tiller being swingably linked with said forward end of said first slider, and said second end of said tiller being swingably linked with said forward end of said second slider, so that a first rotation of said tiller in a first direction about a tiller axis drives said first slider toward the cartridge loading end of the disk drive while driving said second slider toward the remote end of the disk drive, and a second rotation of said tiller in a second direction about said tiller axis drives said first slider toward the remote end of the disk drive while driving said second slider toward the cartridge loading end of the disk drive;

a cartridge receiver for receiving a respective cartridge containing a disk with a central hub, said cartridge receiver being moveable between an upper position and a lower position when said sliders are driven by said tiller; and a first lifting pin and a second lifting pin associated with said cartridge receiver, said first lifting pin slidably fitting into one of said S-shaped slots, and said second lifting pin slidably fitting into the other S-shaped slot, said lifting pins being non-coplanar with a plane that is parallel to the ends of the disk drive and perpendicular to a base plate, and that passes through substantially the center of the spindle magnet.

2. The apparatus according to claim 1 further including a stop cooperative with said sliders, said stop for preventing said sliders from further movement when the disk is fully loaded.

3. The apparatus according to either claim 1 or 2 further including a first slider channel in which said first slider is slidably mounted and a second slider channel in which said second slider is slidably mounted.

4. The apparatus according to either claim 1 or 2 wherein said base plate includes one pair of substantially vertical slots in which said lifting pins are accommodated in a raising and lowering motion of the receiver.

5. The apparatus according to claim 3 wherein said base plate includes one pair of substantially vertical slots in which said lifting pins are accommodated in a raising and lowering motion of the receiver.

6. The apparatus according to either claim 1 or 2 wherein a label end of the cartridge remains visible when the cartridge is loaded in the drive.

7. The apparatus according to claim 3 wherein a label end of the cartridge remains visible when the cartridge is loaded in the drive.

8. The apparatus according to claim 4 wherein a label end of the cartridge remains visible when the cartridge is loaded in the drive.

9. A disk drive system having a spindle magnet, a spindle motor, and including the apparatus recited in claim 1 wherein rotation of said tiller in the first direction tiltably unloads the disk from the spindle magnet, and rotation of said tiller in the second direction tiltably loads the disk onto the spindle magnet with a raising and lowering motion.

10. The disk drive system according to claim 9 further including a stop cooperative with said sliders, said stop for preventing said sliders from further movement when the disk is fully loaded.

11. The disk drive system according to claim 10 further including a first slider channel in which said first slider is slidably mounted and a second slider channel in which said second slider is slidably mounted.

12. The disk drive system according to claim 9 wherein said base plate includes one pair of substantially vertical slots in which said lifting pins are accommodated in a raising and lowering motion of the receiver.

13. The disk drive system according to claim 10 wherein said base plate includes one pair of substantially vertical slots in which said lifting pins are accommodated in a raising and lowering motion of the receiver.

14. A method of manufacturing a cartridge loading and unloading mechanism, said method comprising the steps of:

forming a first slider having only one S-shaped slot;

forming a second slider having only one S-shaped slot;

placing said first slider in a housing so that a first end of said first slider is adjacent a first end of said housing and a second end of said first slider is adjacent a second end of said housing;

placing said second slider in said housing so that a first end of said second slider is adjacent the first end of said housing and the second end of said second slider is adjacent the second end of said housing;

swingably connecting a first end of a tiller to said first slider, and swingably connecting a second end of said tiller to said second slider, so that rotation of said tiller in a first rotational direction about a tiller axis drives said first slider in a first direction while driving said second slider in a second direction, and a second rotation of said tiller in a second rotational direction about said tiller axis drives said first slider in said second direction while driving said second slider in said first direction; and linking a cartridge receiver to said first slider and to said second slider by their respective S-shaped slots, said cartridge receiver being tiltably movable between an upper position and a lower position when said sliders are driven by said tiller.

15. The method according to claim 14 further including the step of linking a gear train to said tiller.

16. The method according to claim 15 further including the step of linking a motor to said gear train for transmitting a force to said tiller.

17. The method according to claim 16 further including the step of providing a cam between said gear train and said tiller.

18. An optical disk system having a cartridge loading and unloading mechanism manufactured according to the method recited in any one of claim 14, 15, 16, or 17.

19. An apparatus for holding a cartridge, said apparatus comprising:
- a cartridge receiver having first and second lifting points, said first and second lifting points located on opposite sides of said cartridge receiver and positioned to cause said cartridge receiver to tilt about a first axis when a force is applied to said first and second lifting points to thereby move a first end of said cartridge receiver from a first position to a second position wherein said first and second lifting points are provided by first and second lifting pins on said cartridge receiver;
- a stop for impeding movement of said first end of said cartridge receiver when it has moved to said second position, said stop also providing a pivot point for movement of a second end of said cartridge receiver from a first position to a second position; and
- a first slider having only one S-shaped slot formed therein and a second slider having only one S-shaped formed therein, said first lifting pin being slidably contained within said S-shaped slot of said first slider and said second lifting pin being slidably contained within said S-shaped slot of said second slider.

20. The apparatus according to claim 19 further including a tiller arm having a first end connected to a first end of said first slider and said tiller arm having a second end connected to a first end of said second slider, wherein rotation of said tiller arm about a tiller axis causes said first and second sliders to move in opposite directions.

21. A cartridge unloading apparatus for a disk drive having a cartridge loading end, a remote end, and a base plate, the apparatus for tiltably unloading a disk from a spindle magnet with a peeling action, the apparatus comprising in combination:

- a first slider having a forward end adjacent the cartridge loading end of the disk drive and a remote end adjacent the remote end of the disk drive, said first slider further having only one S-shaped slot formed therein;
- a second slider having a forward; end adjacent the cartridge loading end of the disk drive and a remote end adjacent the remote end of the disk drive, said second slider further having only one S-shaped slot formed therein;
- a tiller having a first end and a second end, said first end of said tiller being swingably linked with said forward end of said first slider, and said second end of said tiller being swingably linked with said forward end of said second slider, so that a first rotation of said tiller in a first direction about a tiller axis drives said first slider toward the cartridge loading end of the disk drive while driving said second slider toward the remote end of the disk drive, and a second rotation of said tiller in a second direction about said tiller axis drives said first slider toward the remote end of the disk drive while driving said second slider toward the cartridge loading end of the disk drive;
- a cartridge receiver for receiving a respective cartridge containing a disk with a central hub, said cartridge receiver being moveable between an upper position and a lower position when said sliders are driven by said tiller; and
- a first lifting pin and a second lifting pin associated with said cartridge receiver, said first lifting pin slidably fitting into one of said S-shaped slots, and said second lifting pin slidably fitting into the other S-shaped slot, said lifting pins being non-coplanar with a plane that is parallel to the ends of the disk drive and perpendicular to a base plate, and that passes through substantially the center of the spindle magnet, said base plate including one pair of substantially vertical slots in which said lifting pins are accommodated in a raising and lowering motion of the receiver.

* * * * *